United States Patent
Choi et al.

(10) Patent No.: US 8,918,110 B2
(45) Date of Patent: Dec. 23, 2014

(54) METHOD AND APPARATUS FOR DETECTING A SEGMENT IDENTIFIER IN A WIRELESS COMMUNICATION SYSTEM

(75) Inventors: Jin Soo Choi, Anyang-si (KR); Han Gyu Cho, Anyang-si (KR); Jin Sam Kwak, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 193 days.

(21) Appl. No.: 13/581,608

(22) PCT Filed: Feb. 28, 2011

(86) PCT No.: PCT/KR2011/001386
§ 371 (c)(1),
(2), (4) Date: Aug. 28, 2012

(87) PCT Pub. No.: WO2011/108828
PCT Pub. Date: Sep. 9, 2011

(65) Prior Publication Data
US 2013/0130702 A1  May 23, 2013

Related U.S. Application Data

(60) Provisional application No. 61/309,406, filed on Mar. 1, 2010, provisional application No. 61/309,444, filed
(Continued)

(51) Int. Cl.
*H04W 40/00* (2009.01)
*H04J 3/06* (2006.01)
(Continued)

(52) U.S. Cl.
CPC ........... *H04W 16/02* (2013.01); *H04J 11/0069* (2013.01); *H04L 27/2613* (2013.01); *H04L 27/2692* (2013.01); *H04L 5/0007* (2013.01); *H04W 8/26* (2013.01); *H04W 24/00* (2013.01)
USPC ............................. 455/448; 455/447; 370/350

(58) Field of Classification Search
CPC ..... H04W 16/02; H04W 16/12; H04W 16/24; H04W 84/045; H04W 24/00; H04W 24/02; H04W 28/16; H04W 56/00; H04W 72/00; H04W 72/04; H04W 72/0406; H04W 72/0433; H04W 72/0453; H04L 5/0007; H04L 5/0048; H04L 5/0044; H04L 2012/5652; H04L 27/2613; H04L 27/2655; H04L 27/2656; H04J 11/0069–11/0093; H04B 7/18539
USPC ........ 455/422.1, 434, 435.1–437, 446–452.1, 455/464; 370/312, 328–330, 338, 341, 350, 370/411, 437, 502, 509–515
See application file for complete search history.

(56) References Cited

U.S. PATENT DOCUMENTS 7,668,253 B2   2/2010  Hwang et al.
2002/0019233 A1*  2/2002  Leung et al. .................. 455/447
(Continued)

OTHER PUBLICATIONS

Pushpa, K.; Nanda Kishore, C.; Yoganandam, Y., "A New Technique for Frame Synchronization of OFDM Systems," India Conference (INDICON), 2009 Annual IEEE , vol., no., pp. 1,5, Dec. 18-20, 2009 doi: 10.1109/INDCON.2009.5409477.*

(Continued)

*Primary Examiner* — George Eng
*Assistant Examiner* — Umair Ahsan
(74) *Attorney, Agent, or Firm* — Lee, Hong, Degerman, Kang & Waimey

(57) ABSTRACT

The present invention relates to a segment identifier detection method performed by a terminal if a segment being administrated by a base station in a wireless communication system has the frequency reuse factor of 3 and 2 at the same time. In particular, the method comprises: acquiring a cell identifier and a segment identifier corresponding to the cell identifier from a secondary advanced preamble (SA-preamble) that has been received from the base station; determining a frequency reuse factor of the base station; and if the frequency reuse factor is 2 and the obtained segment identifier is a third segment identifier, transforming the segment identifier corresponding to the cell identifier into a first segment identifier or a second segment identifier.

6 Claims, 10 Drawing Sheets

Related U.S. Application Data on Mar. 2, 2010, provisional application No. 61/309,428, filed on Mar. 2, 2010, provisional application No. 61/310,678, filed on Mar. 4, 2010, provisional application No. 61/306,668, filed on Mar. 4, 2010.

(51) Int. Cl.
*H04W 16/02* (2009.01)
*H04J 11/00* (2006.01)
*H04L 27/26* (2006.01)
*H04L 5/00* (2006.01)
*H04W 8/26* (2009.01)
*H04W 24/00* (2009.01)

(56) References Cited

U.S. PATENT DOCUMENTS

| 2006/0009224 | A1  | 1/2006 | Lim et al. |
| 2008/0090580 | A1* | 4/2008 | Sung et al. ............... 455/450 |
| 2009/0176507 | A1  | 7/2009 | Wu et al. |
| 2009/0219883 | A1  | 9/2009 | Cho et al. |
| 2010/0040000 | A1* | 2/2010 | Jang et al. ............... 370/329 |
| 2011/0149878 | A1* | 6/2011 | Ahmadi et al. ............ 370/329 |
| 2012/0015645 | A1* | 1/2012 | Moon et al. ............. 455/422.1 |

OTHER PUBLICATIONS

PCT International Application No. PCT/KR2011/001386, Written Opinion of the International Searching Authority dated Oct. 31, 2011, 14 pages.

* cited by examiner

↓ : PA-peamble carrier set

METHOD AND APPARATUS FOR DETECTING A SEGMENT IDENTIFIER IN A WIRELESS COMMUNICATION SYSTEM

CROSS-REFERENCE TO RELATED APPLICATIONS

This application is the National Stage filing under 35 U.S.C. 371 of International Application No. PCT/KR2011/001386, filed on Feb. 28, 2011, which claims the benefit of U.S. Provisional Application Ser. No. 61/309,406, filed on Mar. 1, 2010, U.S. Provisional Application Ser. No. 61/309,428, filed on Mar. 2, 2010, U.S. Provisional Application Ser. No. 61/309,444, filed on Mar. 2, 2010, U.S. Provisional Application Ser. No. 61/310,668, filed on Mar. 4, 2010, and U.S. Provisional Application Ser. No. 61/310,678, filed on Mar. 4, 2010, the contents of which are all hereby incorporated by reference herein in their entirety.

TECHNICAL FIELD

The present invention relates to a wireless communication system, and more particularly, to a method and apparatus for detecting a segment identity at a mobile station when a frequency reuse factor of 3 and a frequency reuse factor of 2 can coexist in a segment managed by a base station in a wireless communication system.

BACKGROUND ART

FIG. 1 exemplarily shows a wireless communication system. Referring to FIG. 1, a wireless communications system 100 includes of a plurality of Base Stations (BSs) 110 and a plurality of Mobile Stations (MSs) 120. The wireless communications system 100 may include a homogeneous network or a heterogeneous network. The heterogeneous network refers to a network in which different network entities including an Institute of Electrical and Electronics Engineers (IEEE) 802.16e system, an IEEE 802.16m system, a $3^{rd}$ Generation Partnership Project (3GPP) Long Term Evolution (LTE) system, and a WiFi system coexist. The homogeneous network may be divided into a macro cell, a femto cell, a pico cell, a relay, and the like. Generally, the BS refers to a fixed station that communicates with MSs. The BSs 110a, 110b, and 110c provide services to specific geographical areas 102a, 102b and 102c, respectively. To enhance system performance, each of the specific geographical areas may be further divided into a plurality of subareas 104a, 104b, and 104c. Each of the subareas may be referred to as a cell, a sector, or a segment. In the IEEE 802.16e system, a cell identity is allocated based on the entire system. In contrast, a sector or segment identity is allocated based on a specific area in which each BS provides a service and has a value of 0 to 2. The MSs 120 are generally distributed in a wireless communication system and may be fixed or mobile. Each MS may communicate with one or more BSs at a certain time in uplink and downlink. The BS and the MS may perform communication using Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination thereof. In the present specification, uplink refers to a communication link from an MS to a BS and downlink refers to a communication link from a BS to an MS.

DETAILED DESCRIPTION OF THE INVENTION

Technical Problems

An object of the present invention is to provide a method and apparatus for detecting a segment identity at an MS when a frequency reuse factor of 3 and a frequency reuse factor of 2 can coexist in a segment managed by a BS in a wireless communication system.

It will be appreciated by persons skilled in the art that that the technical objects that can be achieved through the present invention are not limited to what has been particularly described hereinabove and other technical objects of the present invention will be more clearly understood from the following detailed description.

Technical Solutions

According to one aspect of the present invention, a method for detecting a segment identity at a mobile station in a wireless communication system includes acquiring a cell identity and a segment identity corresponding to the cell identity from a Secondary Advanced (SA)-preamble sequence received from a base station; determining a frequency reuse factor of the base station; and if the frequency reuse factor is 2 and the acquired segment identity is a third segment identifier, converting the segment identity corresponding to the cell identity into a first segment identity or a second segment identity.

2. The method of claim 1, wherein the first to third segment identities identify three segments managed by the base station, and the first and second segment identities identify two segments managed by the base station. The conversion of the segment identity may be performed according to the following Equation:

If mod((mod($IDCell$,256),4)=0 or 1, then, segment $ID$=0

If mod((mod($IDCell$,256),4)=2 or 3, then, segment $ID$=1         [Equation]

where values of the first, second, and third segment identities are 0, 1, and 2, respectively, IDCell indicates a cell identity, and segment ID indicates a converted segment identity.

According to another aspect of the present invention, A mobile station includes a reception module for receiving a Secondary Advanced (SA)-preamble sequence received from a base station; and a processor for acquiring a cell identity and a segment identity corresponding to the cell identity from the SA-preamble sequence, determining a frequency reuse factor of the base station, and if the frequency reuse factor is 2 and the acquired segment identity is a third segment identifier, converting the segment identity corresponding to the cell identity into a first segment identity or a second segment identity. The processor may convert the segment identity corresponding to the cell identity according to the following Equation:

If mod((mod($IDCell$,256),4)=0 or 1, then, segment $ID$=0

If mod((mod($IDCell$,256),4)=2 or 3, then, segment $ID$=1         [Equation]

where values of the first, second, and third segment identities are 0, 1, and 2, respectively, IDCell indicates a cell identity, and segment ID indicates a converted segment identity.

The first to third segment identities may identify three segments managed by the base station, and the first and second segment identities may identify two segments managed by the base station.

If the frequency reuse factor of the base station is 3, an SA-preamble sequence of a cell identity x included in one segment identity may have a complex conjugate relationship with an SA-preamble sequence of a cell identity x+128 included in the one segment identity, and the one segment identity may include 256 cell identities.

If the frequency reuse factor of the base station is 2, each of the first and second segment identities may include 384 cell identities and the 384 cell identities may be partitioned into 129 cell identities for a macro base station and 255 cell identities for a non-macro base station.

Advantageous Effects

According to embodiments of the present invention, when a frequency reuse factor of 3 and a frequency reuse factor of 2 can coexist in a segment managed by a base station in a wireless communication system, an MS can effectively detect a segment identity without any restriction of use of a cell identity of a BS.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

The configuration, operation and other features of the present invention will be understood by the embodiments of the present invention described with reference to the accompanying drawings. The following embodiments are examples of applying the technical features of the present invention to system using a plurality of orthogonal subcarriers. For convenience, although the present invention is described using an IEEE 802.16 system, the present invention is applicable to various wireless communication systems including a $3^{rd}$ Generation Partnership Project (3GPP) system.

Figure 1:
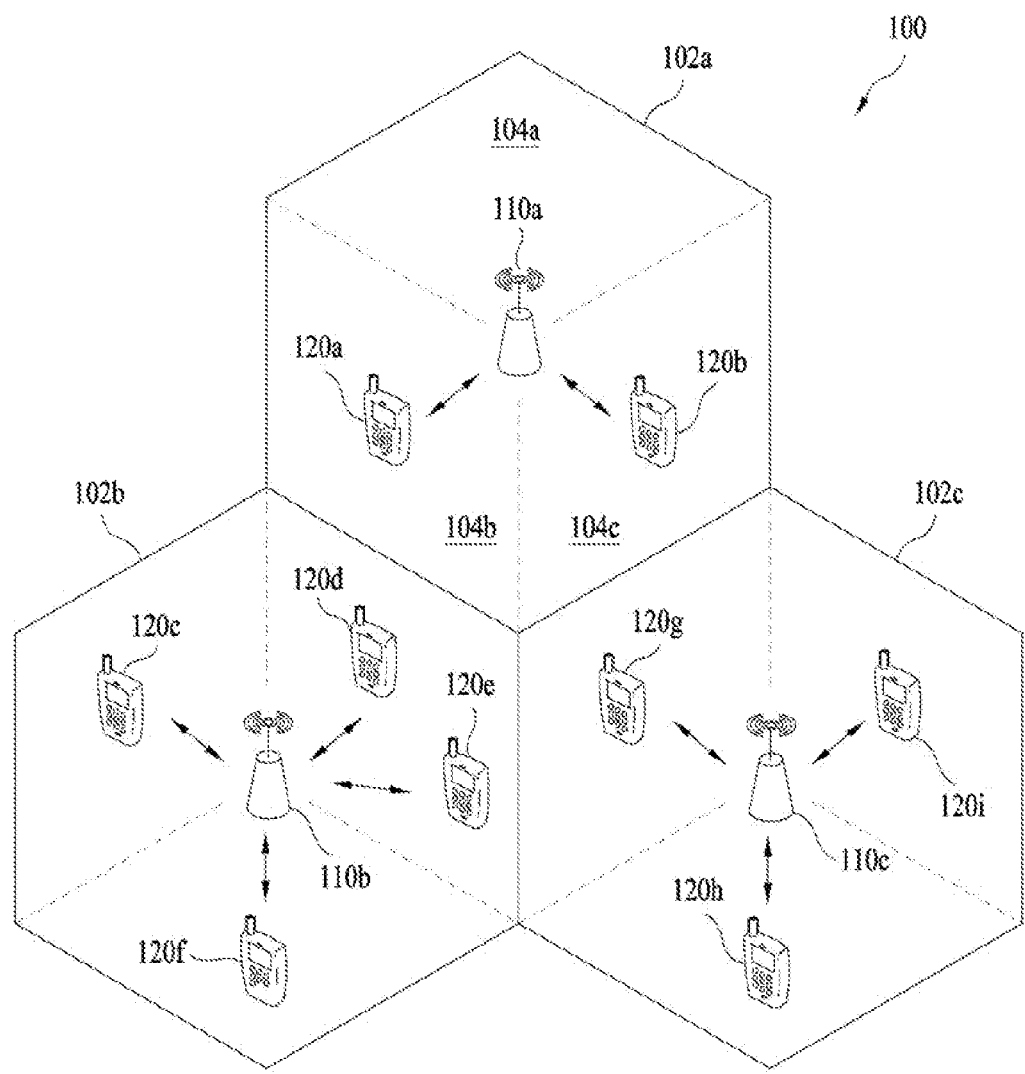
FIG. 1 is a diagram exemplarily showing a wireless communication system.
Figure 2:
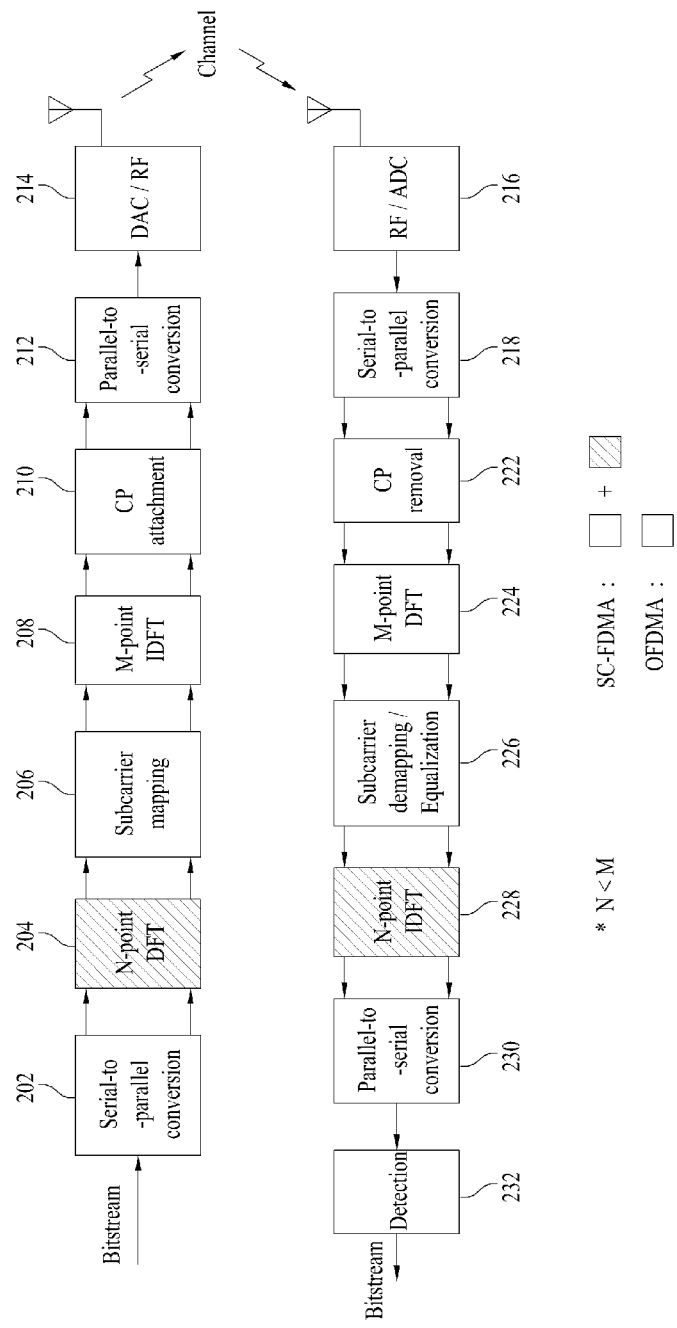
FIG. 2 is a block diagram exempla showing a transmitter and a receiver for OFDMA and SC-FDMA.

FIG. 2 is a block diagram exemplarily showing a transmitter and a receiver for OFDMA and SC-FDMA. In uplink, the transmitter may be a part of an MS and the receiver may be a part of a BS. In downlink, the transmitter may be a part of the BS and the receiver may be a part of the MS.

Referring to FIG. 2, an OFDMA transmitter includes a serial-to-parallel converter 202, a subcarrier mapping module 206, an M-point Inverse Discrete Fourier Transform (IDFT) module 208, a Cyclic Prefix (CP) attachment module 210, a parallel-to-serial converter 212, and a Radio Frequency (RF)/Digital-to-Analog Converter (DAC) module 214.

Signal processing in the OFDMA transmitter is as follows. First, a bitstream is modulated into a data symbol sequence. The bitstream may be obtained by performing various types of signal processing including channel encoding, interleaving, and scrambling of a data block delivered from a Medium Access Control (MAC) layer. The bitstream is also referred to as a codeword and is equivalent to a data block received from the MAC layer. The data block received from the MAC layer is referred to as a transport block as well. A modulation scheme may include, but is not limited to, Binary Phase Shift Keying (BPSK), Quadrature Phase Shift Keying (QPSK), and n-Quadrature Amplitude Modulation (n-QAM). Next, a serial data symbol sequence is converted into data symbols N by N in parallel (202). The N data symbols are mapped to N subcarriers allocated among a total of M subcarriers and the (M-N) remaining subcarriers are padded with 0s (206). The data symbol mapped in a frequency domain is converted to a time-domain sequence through M-point IDFT processing (208). Thereafter, in order to reduce inter-symbol interference and inter-carrier Interference, an OFDMA symbol is generated by attaching a CP to the time-domain sequence (210). The generated parallel OFDMA symbol is converted into a serial OFDMA symbol (212). The OFDMA symbol is then transmitted to a receiver through digital-to-analog conversion, frequency upconversion, and the like (214). Available subcarriers among the (M-N) remaining subcarriers are allocated to another user. Meanwhile, an OFDMA receiver includes an RF/Analog-to-Digital Converter (ADC) module 216, a serial-to-parallel converter 218, a CP removal module 222, an M-point Discrete Fourier Transform (DFT) module 224, a subcarrier demapping/equalization module 226, a parallel-to-serial converter 230, and a detection module 232. Signal processing of the OFDMA receiver has a configuration opposite to that of the OFDMA transmitter.

Meanwhile, compared to the OFDMA transmitter, an SC-FDMA transmitter further includes an N-point DFT module 204 before the subcarrier mapping module 206. The SC-FDMA transmitter spreads a plurality of data in a frequency domain through DFT prior to IDFT processing, thereby considerably decreasing a Peak-to-Average Power Ratio (PAPR) of a transmission signal in comparison with an OFDMA scheme. Compared to the OFDMA receiver, an SC-FDMA receiver further includes an N-point IDFT module 228 after the subcarrier demapping module 226. Signal processing of the SC-FDMA receiver has a configuration opposite to that of the SC-FDMA transmitter.

The modules shown in FIG. 2 are for description only and the transmitter and/or receiver may further include necessary modules. Some modules/functions may be omitted or separated into different modules, and two or more modules may be integrated into one module.

rier for a guard band and a DC component. Parameters for characterizing the OFDM symbol include BW, $N_{used}$, n, G, etc. BW is a nominal channel bandwidth and $N_{used}$ is the number of subcarriers used for signal transmission. n is a sampling factor and determines a subcarrier spacing and a useful symbol time along with BW and $N_{used}$. G is a ratio of useful time to CP time.

Table 1 shows an example of OFDMA parameters.

| The nominal channel bandwidth, BW (MHz) | | | | 5 | 7 | 8.75 | 10 | 20 |
|---|---|---|---|---|---|---|---|---|
| Sampling factor, n | | | | 28/25 | 8/7 | 8/7 | 28/25 | 28/25 |
| Sampling frequency, $F_s$ (MHz) | | | | 5.6 | 8 | 10 | 11.2 | 22.4 |
| FFT size, $N_{FFT}$ | | | | 512 | 1024 | 1024 | 1024 | 2048 |
| Subcarrier spacing, $\Delta f$ (kHz) | | | | 10.94 | 7.81 | 9.77 | 10.94 | 10.94 |
| Useful symbol time, $T_b$ (μs) | | | | 91.4 | 128 | 102.4 | 91.4 | 91.4 |
| CP ratio, G = 1/8 | | OFDMA symbol time, $T_s$ (μs) | | 102.857 | 144 | 115.2 | 102.857 | 102.857 |
| | FDD | Number of OFDMA symbols per 5 ms frame | | 48 | 34 | 43 | 48 | 48 |
| | | Idle time (μs) | | 62.857 | 104 | 46.40 | 62.857 | 62.857 |
| | TDD | Number of OFDMA symbols per 5 ms frame | | 47 | 33 | 42 | 47 | 47 |
| | | TTG + RTG (μs) | | 165.714 | 248 | 161.6 | 165.714 | 165.714 |
| CP ratio, G = 1/16 | | OFDMA symbol time, $T_s$ (μs) | | 97.143 | 136 | 108.8 | 97.143 | 97.143 |
| | FDD | Number of OFDMA symbols per 5 ms frame | | 51 | 36 | 45 | 51 | 51 |
| | | Idle time (μs) | | 45.71 | 104 | 104 | 45.71 | 45.71 |
| | TDD | Number of OFDMA symbols per 5 ms frame | | 50 | 35 | 44 | 50 | 50 |
| | | TTG + RTG (μs) | | 142.853 | 240 | 212.8 | 142.853 | 142.853 |
| CP ratio, G = 1/4 | | OFDMA symbol time, $T_s$ (μs) | | 114.286 | 160 | 128 | 114.286 | 114.286 |
| | FDD | Number of OFDMA symbols per 5 ms frame | | 43 | 31 | 39 | 43 | 43 |
| | | Idle time (μs) | | 85.694 | 40 | 8 | 85.694 | 85.694 |
| | TDD | Number of OFDMA symbols per 5 ms frame | | 42 | 30 | 38 | 42 | 42 |
| | | TTG + RTG (μs) | | 199.98 | 200 | 136 | 199.98 | 199.98 |
| Number of Guard Sub-Carriers | | Left | | 40 | 80 | 80 | 80 | 160 |
| | | Right | | 39 | 79 | 79 | 79 | 159 |
| Number of Used Sub-Carriers | | | | 433 | 865 | 865 | 865 | 1729 |
| Number of Physical Resource Unit (18 × 6) in a type-1 subframe. | | | | 24 | 48 | 48 | 48 | 96 |

Figure 3:
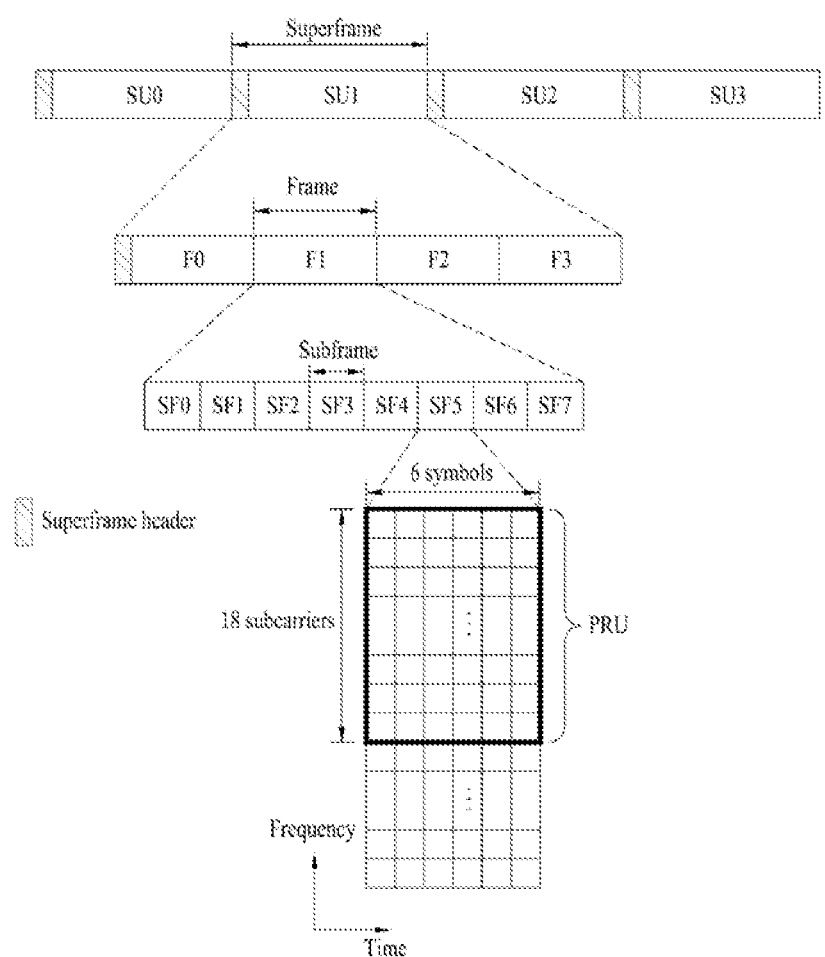
FIG. 3 is a diagram exemplarily showing a radio frame structure of an IEEE 802.16m system.

FIG. 3 exemplarily shows a radio frame structure of an IEEE 802.16m system.

Referring to FIG. 3, the radio frame structure includes 20-ms superframes SU0 to SU3 supporting a bandwidth of 5 MHz, 8.75 MHz, 10 MHz, or 20 MHz. The superframe includes four 5-ms frames F0 to F3 having the same size and begins with a Superframe Header (SFH). The SFH carries essential system parameters and system configuration information.

The frame includes eight subframes SF0 to SF7. Each subframe is allocated for downlink or uplink transmission. Each subframe includes a plurality of OFDM symbols in a time domain and includes a plurality of subcarriers in a frequency domain. The OFDM symbol may be referred to as an OFDMA symbol, an SC-FDMA symbol, etc according to a multiple access scheme. The number of OFDM symbols included in the subframe may be variously changed according to a channel bandwidth or a CP length.

Figure 4:
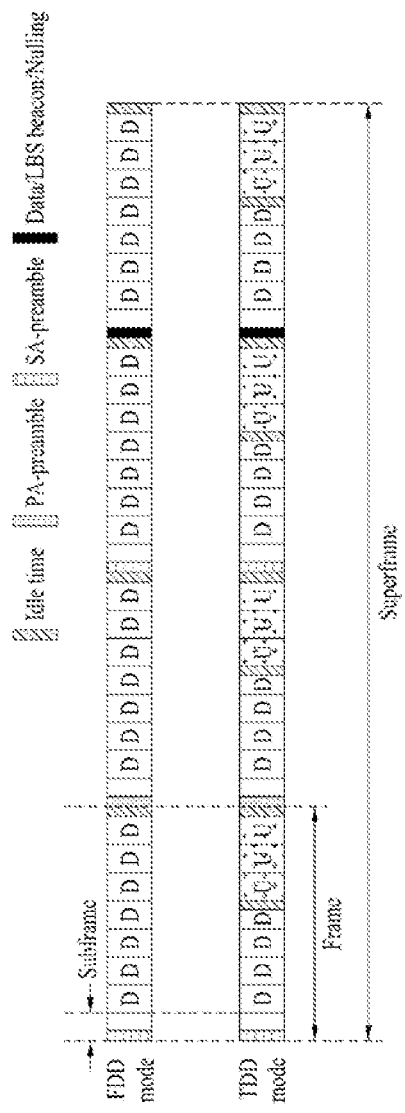
FIG. 4 is a diagram showing an example of transmitting a synchronization channel in an IEEE 802.16m system.

The OFDM symbol includes a plurality of subcarriers and the number of subcarriers is determined according to the size of Fast Fourier Transform (FFT). The type of the subcarrier may be divided into a data subcarrier for data transmission, a pilot subcarrier for channel measurement, and a null subcar- FIG. 4 shows an example of transmitting a synchronization channel in an IEEE 802.16m system. This embodiment assumes an IEEE 802.16m only mode.

Referring to FIG. 4, in an IEEE 802.16m system, 4 synchronization channels (SCHs) are transmitted in one superframe. In the IEEE 802.16m system, a downlink SCH includes a primary SCH and a secondary SCH. The primary SCH includes a Primary Advanced preamble (PA-preamble) and the secondary SCH includes a Secondary Advanced preamble (SA-preamble). In FDD mode and TDD mode, a downlink SCH can be transmitted via the first OFDMA symbol of a frame.

The PA-preamble is typically used to obtain partial information such as system frequency bandwidth information and subcarrier configuration information. The SA-preamble is typically used to obtain a cell identity and may be used, for example, for Received Signal Strength Indication (RSSI) measurement. The PA-preamble may be transmitted through the first frame FO, while the SA-preamble may be transmitted through the second to fourth frames FO1 to FO3.

Figure 5:
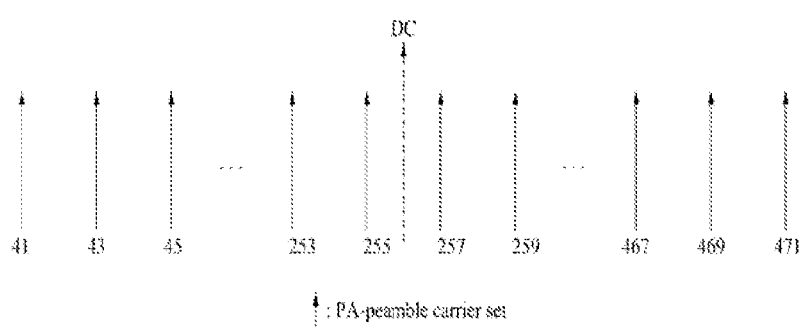
FIG. 5 is a diagram showing subcarriers having a PA-preamble mapped thereto in an IEEE 802.16m system.

FIG. 5 shows subcarriers having a PA-preamble mapped thereto in an IEEE 802.16m system.

Referring to FIG. 5, the length of a PA-preamble is 216 and is irrelevant to FFT size. The PA-preamble is inserted at an interval of 2 subcarriers and zeros are inserted into the remaining subcarriers. For example, the PA-preamble may be inserted into subcarriers 41, 43, . . . , 469, and 471. The PA-preamble is able to carry system bandwidth information and subcarrier configuration information. If a subcarrier index 256 is reserved as DC, the subcarrier having a sequence mapped thereto may be determined using Equation 1.

$$PAPreambleCarrierSet=2 \times k+41 \qquad [\text{Equation 1}]$$

where k denotes an integer ranging from 0 to 215.

For instance, a QPSK type sequence of length 216 proposed in Table 1 may be used for the PA-preamble.

TABLE 1

| Index | Carrier | BW | Series to modulate |
|---|---|---|---|
| 0 | Fully configured | 5 MHz | 6DB4F3B16BCE59166C9CEF7C3C8CA5EDFC16A9D1DC01F2AE6AA08F |
| 1 | | 7, 8.75 and 10 MHz | 1799628F3B9F8F3B22C1BA19EAF94FEC4D37DEE97E027750D298AC |
| 2 | | 20 MHz | 92161C7C19BB2FC0ADE5CEF3543AC1B6CE6BE1C8DCABDDD319EAF7 |
| 3 | | Reserved | 6DE116E665C395ADC70A89716908620868A60340BF35ED547F8281 |
| 4 | | Reserved | BCFDF60DFAD6B027E4C39DB20D783C9F467155179CBA31115E2D04 |
| 5 | | Reserved | 7EF1379553F9641EE6ECDBF5F144287E329606C616292A3C77F928 |
| 6 | | Reserved | 8A9CA262B8B3D37E3158A3B17BFA4C9FCFF4D396D2A93DE65A0E7C |
| 7 | | Reserved | DA8CE648727E4282780384AB53CEEBD1CBF79E0C5DA7BA85DD3749 |
| 8 | | Reserved | 3A65D1E6042E8B8AADC701E210B5B4B650B6AB31F7A918893FB04A |
| 9 | | Reserved | D46CF86FE51B56B2CAA84F26F6F204428C1BD23F3D888737A0851C |
| 10 | Partially configured | N/A | 640267A0C0DF11E475066F1610954B5AE55E189EA7E72EFD57240F |

Figure 6:
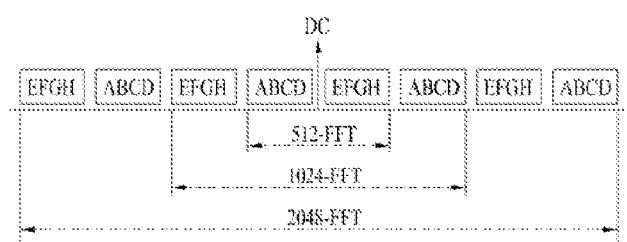
FIG. 6 is a diagram showing an example of mapping an SA-preamble to a frequency domain in an IEEE 802.16m system.

FIG. 6 shows an example of mapping an SA-preamble to a frequency domain in an IEEE 802.16m system.

Referring to FIG. 6, the number of subcarriers allocated to an SA-preamble can vary according to FFT size. For instance, the length of the SA-preamble may be 144, 288, and 576 for 512-FFT, 1024-FFT, and 2048-FFT, respectively. If 256-th, 512-th, and 1,024-th subcarriers are reserved as DC components for 512-FFT, 1024-FFT and 2048-FFT, respectively, the subcarriers allocated to the SA-preamble may be determined by Equation 2.

$$SAPreambleCarrierSet_n = n + 3 \cdot k + 40 \cdot \frac{N_{SAP}}{144} + \left\lfloor \frac{2 \cdot k}{N_{SAP}} \right\rfloor \qquad [\text{Equation 2}]$$

where n is an SA-preamble carrier set index having a value of 0, 1, or 2 and indicates a segment ID, $N_{SAP}$ denotes the number of subcarriers allocated to an SA-preamble, and k denotes an integer raging from 0 to $N_{SAP}$−1.

Each cell has a cell identity (IDcell) represented as an integer ranging from 0 to 767. The cell identity is defined as a segment index and a specific index assigned to each segment. Generally, the cell identity may be determined by Equation 3.

$$IDcell=256 \cdot n + Idx \qquad [\text{Equation 3}]$$

where n denotes an SA-preamble carrier set index, i.e. a segment identity and has a value of 0, 1 or 2 and Idx indicates an integer ranging from 0 to 255 and is determined by Equation 4.

$$Idx = 2 \cdot \text{mod}(q, 128) + \left\lfloor \frac{q}{128} \right\rfloor \qquad [\text{Equation 4}]$$

where q indicates an SA-preamble sequence index having an integer ranging from 0 to 255.

In the case of 512-FFT, a 288-bit SA-preamble is divided into 8 subblocks A, B, C, D, E, F, G, and H each having a length of 36 bits. Each segment ID has a different sequence subblock.

The SA-preamble defined in the 802.16m system will be described in detail later. In the case of the 512-FFT, the subblocks A, B, C, D, E, F, G and H are sequentially modulated and then mapped to an SA-preamble subcarrier set corresponding to a segment ID. When an FFT size increases, the basic blocks A, B, C, D, E, F, G and H are repeated in the same order. For example, in the case of 1024-FFT, E, F, G, H, A, B, C, D, E, F, G, H, A, B, C, and D are sequentially modulated and then mapped to the SA-preamble subcarrier set corresponding to the segment ID.

A circular shift is applicable to 3 consecutive subcarriers after the subcarrier mapping according to Equation 2. Each subblock has the same offset and a circular shift pattern for each subblock becomes [2, 1, 0, . . . , 2, 1, 0, . . . , 2, 1, 0, 2, 1, 0, DC, 1, 0, 2, 1, 0, 2, . . . , 1, 0, 2, . . . , 1, 0, 2]. Herein, a shift includes a right circular shift.

Figure 7:
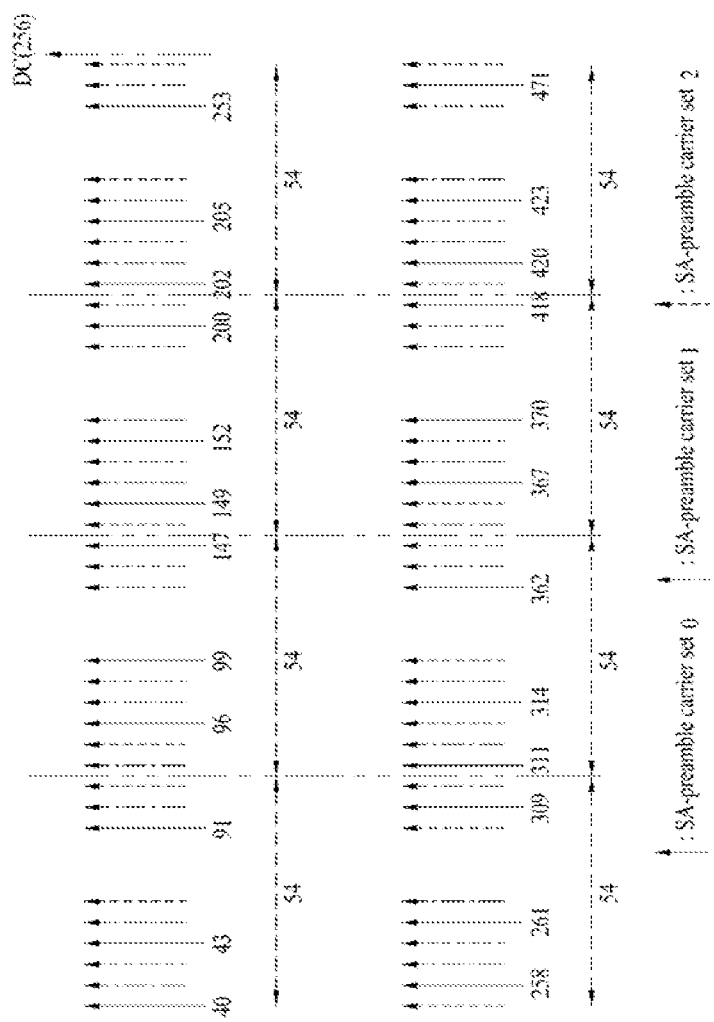
FIG. 7 is a diagram exemplarily showing an SA-preamble structure in a frequency domain for 512-FFT in an IEEE 802.16m system.

FIG. 7 exemplarily shows an SA-preamble structure in a frequency domain for 512-FFT. In the case of 512-FFT, blocks A, B, C, D, E, F, G, and H can experience right circular shifts of (0, 2, 1, 0, 1, 0, 2, 1), respectively.

Tables 2 to 4 exemplarily show 128 SA-preamble sequences.

A mother sequence is indicated by an index q and is represented in hexadecimal format. Sequences of Tables 2 to 4 can correspond to segments 0 to 2, respectively. In Tables 2 to 4, blk indicates a subblock constructing each sequence.

A modulation sequence can be obtained by converting $X_i^{(q)}$ (X=A, B, C, D, E, F, G, H) into two QPSK symbols $v_{2i}^{(q)}$ $v_{2i+1}^{(q)}$. In this case, i indicates an integer ranging from 0 to 8 and q indicates an integer ranging from 0 to 127. Equation 5 shows an example of converting $X_i^{(q)}$ into 2 QPSK symbols.

$$v_{2i}^{(q)} = \exp\left(j\frac{\pi}{2}(2 \cdot b_{i,0}^{(q)} + b_{i,1}^{(q)})\right)$$ [Equation 5]

$$v_{2i+1}^{(q)} = \exp\left(j\frac{\pi}{2}(2 \cdot b_{i,2}^{(q)} + b_{i,3}^{(q)})\right)$$

where $$X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)}$$

In Equation 5, binary numbers 00, 01, 10 and 11 are converted into 1, j, −1 and −j, respectively. This is purely exemplary and $X_i^{(q)}$ may be converted into QPSK symbols using other similar Equations.

For example, if the sequence index q is 0, a sequence of the subblock A is 314C8648F. This sequence is modulated into a QPSK signal of [+1 −j +1 +j +j +1 −j +1 −1 +1 +j −1 +j +1 −1 +1 −j −j].

Meanwhile, 128 sequences exemplarily shown in each of the tables may be extended twice using a complex conjugate operation. Namely, 128 sequences may be additionally generated by the complex conjugate operation and indexes ranging from 128 to 255 may be assigned to the generated sequence. In other words, an SA-preamble sequence of a sequence index x corresponding to one segment ID has a complex conjugate relationship with an SA-preamble sequence of a sequence index x+128 corresponding to the one segment ID. The following Equation 6 represents a sequence extended from a mother sequence by the complex conjugate operation.

$$v_k^{(q)} = (v_k^{(q-128)})^* \text{ for } 128 \le q < 255$$ [Equation 6]

where k indicates an integer ranging from 0 to $N_{SAP}-1$, $N_{SAP}$ indicates the length of an SA-preamble, a complex conjugate operation (·)* converts a complex signal of (a+jb) into a complex signal of (a−jb) and also converts a complex signal of (a−jb) into a complex signal of (a+jb).

TABLE 2 n = 0: (Segment 0)

| | | | | blk | | | | |
|---|---|---|---|---|---|---|---|---|
| q | A | B | C | D | E | F | G | H |
| 0 | 314C8648F | 18BC23543 | 06361E654 | 27C552A2D | 3A7C69A77 | 011B29374 | 277D31A46 | 14B032757 |
| 1 | 281E84559 | 1A0CDDF7E | 2473A5D5B | 2C6439AB8 | 1CA9304C1 | 0AC3BECD0 | 34122C7F5 | 25362F596 |
| 2 | 00538AC77 | 38F9CBBC6 | 04DBCCB40 | 33CDC6E42 | 181114BE4 | 0766079FA | 2DD2F5450 | 13E0508B2 |
| 3 | 3BE4056D1 | 2C7953467 | 0E5F0DE66 | 03C9B2E7D | 1857FD2E3 | 15A276D4F | 210F282AF | 27CE61310 |
| 4 | 3DBAAE31E | 254AE8A85 | 168B63A64 | 05FDF74FB | 3948B6856 | 33656C528 | 1799C9BA1 | 004E0B673 |
| 5 | 177CE8FBC | 21CEE7F09 | 397CD6551 | 01D4A1A10 | 1730F9049 | 067D89EA9 | 3AC141077 | 3D7AD6888 |
| 6 | 3B78215A1 | 17F921D66 | 385006FDC | 011432C9D | 24ED16EA6 | 0A54922F1 | 02067E65D | 0FEC2128D |
| 7 | 01FF4E172 | 2A704C742 | 3A58705E1 | 3F3F66CD2 | 07CA4C462 | 1854C8AA3 | 03F576092 | 06A989824 |
| 8 | 1A5B7278E | 1630D0D82 | 3001EF613 | 34CCF51A1 | 2120C250A | 06893FA2D | 156073692 | 07178CFA7 |
| 9 | 032E31906 | 2DD318EAA | 1DE55B14D | 0EF4B6FB3 | 27DED0610 | 1BC8440D3 | 0ED86BF8D | 14FAFDE2C |
| 10 | 174725FFD | 0D2FB1732 | 124470F56 | 292D9912B | 1571408A7 | 227197AE9 | 2430BC576 | 0B67304E0 |
| 11 | 1F1DCD669 | 293DD1701 | 0C34F1B84 | 28496EE51 | 3DC41327F | 071C06523 | 28E1657B6 | 02588EFDA |
| 12 | 22E4AA041 | 3810362F1 | 1955F1DE7 | 0D6D2F8BE | 11F31358E | 3EB27BB12 | 1F4E60111 | 119BDA927 |
| 13 | 14300B522 | 152E6D482 | 168DF6E43 | 0740B7AE0 | 14FE7DCDD | 0FA092626 | 23697615A | 1F1331EB8 |
| 14 | 12C65ED00 | 317643CD7 | 2C637A415 | 15E3E5185 | 0F5CBB9E0 | 23290B156 | 26F37EFE8 | 1AA174793 |
| 15 | 1DD6453F0 | 032C4BD39 | 082659BD5 | 320C5E691 | 224E555B2 | 3A9615A8D | 1BED03424 | 28E6A9CED |
| 16 | 068AE7EE9 | 16F724910 | 3803DD9BD | 2A31A2FFB | 010BF5237 | 33CB067E6 | 0280C28B7 | 184417B94 |
| 17 | 1D651280A | 2C7BCF443 | 17324EFB0 | 236E5C411 | 381215183 | 2F076E64E | 0A6F2EE74 | 3DA4196B7 |
| 18 | 27341650F | 1B520099C | 09AC91114 | 000A5F48B | 30AB4B9B6 | 2D0DB0DE6 | 1CF57978A | 2D424406B |
| 19 | 3A01E2FB2 | 0DF5B257B | 019D1C63A | 0EA7DCDDB | 242D96605 | 2DA675F15 | 1DEC54193 | 3B6341C16 |
| 20 | 2DDFAEB05 | 21D0A1700 | 0FA09BB78 | 17DA7F8BB | 06E883B3F | 02E6B929B | 2C1C413B4 | 030E46DD1 |
| 21 | 1B625E3F9 | 0F708F756 | 00CD97B18 | 3F036B4DF | 2CF08C3E5 | 213A5A681 | 14A298D91 | 3D2ED63BC |
| 22 | 2DA48D5A9 | 0C085BD17 | 01903428A | 3DF2A30D9 | 29061309A | 16F7DC40E | 2AF88A583 | 27C1DA5E9 |
| 23 | 30DBAC784 | 20C3B4C56 | 0F1538CB7 | 0DDE7E1BE | 2C312903B | 0FF21E6C2 | 032C15DE3 | 26C9A6BA4 |
| 24 | 3188E8100 | 385FEFE2D | 3967B56C7 | 3F62D246B | 1826A755E | 2CDA895EA | 2FAB77825 | 1B525FF88 |
| 25 | 339467175 | 2DE49506B | 27B7282A9 | 0254470A3 | 3374310AF | 2DF20FD64 | 3848A6806 | 11C183E49 |
| 26 | 02AFA38DC | 0F2AFDDF4 | 1A05650E2 | 061439F88 | 11C275BE0 | 30C41DEC9 | 119E070E9 | 1E76542C1 |
| 27 | 1B364E155 | 086FF808C | 29F1BA9DC | 0A830C788 | 2E70D0B3A | 34EA776B1 | 3D13615C0 | 15FC708D4 |
| 28 | 38ECFC198 | 07034E9B3 | 2340F86B3 | 07562464C | 22823E455 | 1F68D29E9 | 257BB66C6 | 1083992F1 |
| 29 | 375C4F5AB | 3C0F5A212 | 0EA21BC30 | 13E8A26F2 | 17C039773 | 283AD6660 | 1F63AB833 | 2DE933CAF |
| 30 | 2B773E3C5 | 3849BBE6C | 1CAD2E5AB | 0405FA1DE | 1B27B4269 | 3B3BF258F | 300E77286 | 39599C4B1 |
| 31 | 1E878F0BE | 0AE5267EC | 376F42154 | 1CD517CC2 | 302781C47 | 123FEC7E0 | 16664D3D8 | 24B871A55 |
| 32 | 20E200C0A | 1C94D2FF1 | 213F8F01B | 369A536E0 | 161588399 | 29389C7FC | 259855CAC | 06025DCE2 |
| 33 | 28D2E001C | 3C51C3727 | 106F37D0E | 1FB0EFDD1 | 2CD9D33C3 | 1EA190527 | 0BB5A6F9E | 074867D50 |
| 34 | 08EFC44B5 | 1B484EABE | 05FEB2DE2 | 211AF91B5 | 0CF52B1E1 | 002B5C978 | 11D6E5138 | 0D402BDD2 |
| 35 | 337C618F4 | 0A4C31DDA | 1D93003D6 | 006D7D088 | 348043A6D | 325E05758 | 2C53EEEB8 | 15ED8E614 |
| 36 | 38375C2FF | 18C78FD02 | 30C11EF53 | 3916581DD | 1B75263FF | 2D8DFD6A9 | 00C4E8482 | 1D201F96A |
| 37 | 2E10B0D05 | 2EF203893 | 2491D95F1 | 34D995B51 | 32214BDF5 | 3E45674B1 | 3E74AC66E | 1B813A999 |
| 38 | 153E7269D | 2391C7BFC | 1ADD3A595 | 0EFD3086E | 00AD88A8E | 0D8B007CA | 0F22C5F9D | 010E86385 |
| 39 | 3B58C7BFF | 0BA76496E | 3AD0B7BBF | 1D6D10FB3 | 3A607BEFC | 28F122A95 | 057950727 | 179449CB7 |
| 40 | 37AC5194A | 390BD9C00 | 3A48C0461 | 12FBCE4C6 | 2A8DD4171 | 10E9F1E34 | 251F5D167 | 1124E96B1 |
| 41 | 0FEF20C67 | 31EC9EA3F | 275B31143 | 22DA4F02B | 352C0F648 | 21FF5B9F3 | 3E5BC2372 | 0A1AE08FE |
| 42 | 080EDC49B | 17AD7F7BA | 390775B3C | 1380B00DA | 2477FF17C | 2E6D9E5AF | 05381F2DD | 26143CC17 |
| 43 | 2DB485795 | 1B3252799 | 39AD0211C | 3AAE31B76 | 30532A187 | 1C8EA5F5A | 2EA6E4D6B | 30570A2E4 |
| 44 | 11BB4F78A | 12CCE1428 | 2C67EEF99 | 20E3F841A | 20CFCD5F2 | 1618A7B94 | 111FF6092 | 2ED034E06 |
| 45 | 1C66335E5 | 0CA9B9BD2 | 3213028AE | 15542DD28 | 290F7DAE2 | 2137F02D5 | 17DF9445D | 24F162FFB |
| 46 | 360FB966B | 17D878955 | 1C1D67093 | 065B84F3A | 1A1D955E3 | 24C73C11E | 270EA9EB2 | 114DCA02C |
| 47 | 002CE84DD | 0616DD253 | 3EB188345 | 1FF852926 | 37E160F00 | 040DF51EC | 1857A33BA | 230FD8A0D |
| 48 | 233C0A71F | 22E428104 | 0325F8170 | 39566B188 | 32DA16A4A | 039FDF1DC | 27A3E946C | 0D69F26D9 |
| 49 | 0583F9F73 | 378380CB6 | 059D8A960 | 3E3442C7F | 026138ADB | 25F370F1E | 09D3EB2CC | 2D37D50C0 |

TABLE 2-continued

| | | | | n = 0: (Segment 0) | | | | |
|---|---|---|---|---|---|---|---|---|
| | | | | blk | | | | |
| q | A | B | C | D | E | F | G | H |
| 50 | 08DF9CC66 | 2C2E7AA8F | 3CB241ED2 | 03216B4D2 | 39736B451 | 25F6F113F | 08FD2AC3C | 1974574FD |
| 51 | 3D1FF6041 | 2CE2AB97F | 01A734F3B | 1DCF9F3C5 | 268D595CA | 1FBD2A8B8 | 0F1449F86 | 370C352FD |
| 52 | 123218E40 | 3AA057589 | 20F73A16F | 26E3BCA5F | 3A7330DC6 | 12C659384 | 39D99FF1B | 276DFC540 |
| 53 | 185AEDEA4 | 0418B3643 | 382F7700A | 3FC35ED60 | 07BA2F838 | 1BC840C93 | 2469A41EC | 0CE7B4CB0 |
| 54 | 2E194E2BF | 3302A0B28 | 1836001EE | 154A4738A | 36A3BBD72 | 23CCD0EB1 | 044B3A13B | 2B50C8057 |
| 55 | 0B76405D3 | 231AAA728 | 0EE05E9B6 | 0093A21F2 | 2065A01D0 | 1F2B810D4 | 1082F3A73 | 1DAFEA492 |
| 56 | 07AD23A3A | 2091957F1 | 3B9D8CBF0 | 21E4160BE | 1BFB25224 | 3D9085D16 | 03076DD39 | 1DBCF8D03 |
| 57 | 226D70EBF | 3ED15246C | 364130C46 | 22F6D4AA3 | 3FCC9A71B | 3B9283111 | 0484F0E58 | 14574BD47 |
| 58 | 3F49B0987 | 305231FA6 | 0CF4F6788 | 3B9296AED | 2346190C5 | 3365711F4 | 078900D4A | 352686E95 |
| 59 | 1D62AC9A4 | 104EDD1F5 | 1B0E77300 | 1CED8E7F0 | 388E8002C | 1FE6199F4 | 02239CB15 | 1FE5D49A2 |
| 60 | 21314C269 | 28600D12A | 22E4F1BAA | 044E211B1 | 0DECFE1B4 | 3E5B208CC | 1CFC91293 | 21E7A906B |
| 61 | 02C029E33 | 1BA88BE4D | 3742AE82F | 21EF0810F | 17D23F465 | 240446FB5 | 17CCE51D9 | 2C0B0E252 |
| 62 | 16F9D2976 | 10185ECE6 | 2821673FD | 02674271C | 3A8A75B7C | 226D4BF0F | 2216004E5 | 0E8605674 |
| 63 | 06E4CB337 | 32A31755D | 062BE7F99 | 1417A922D | 2271C07E5 | 24D6111FA | 3F2639C75 | 0CE2BB3A0 |
| 64 | 18D139446 | 2426B2EA8 | 352F18410 | 1133C535E | 10CC1A28F | 1A8B54749 | 22A54A6F4 | 2F1920F40 |
| 65 | 22443017D | 2265A18F5 | 14E1DAE70 | 11AC6EA79 | 31A740502 | 3B14311E7 | 3AA31686D | 26A3A961C |
| 66 | 2018F4CA9 | 3A0129A26 | 39BDA332E | 1941B7B49 | 03BBCE0D8 | 20E65BD62 | 2E4A6EE6C | 3B095CCB3 |
| 67 | 0CC97E07D | 11371E5FF | 31DFF2F50 | 17D46E889 | 352B75BEA | 1F1529893 | 21E6F4950 | 1BD034D98 |
| 68 | 275B00B72 | 125F0FE20 | 0FB6DE016 | 0C2E8C780 | 3026E5719 | 119910F5F | 3B647515B | 1D49FED6F |
| 69 | 250616E04 | 0882F53BF | 11518A028 | 3E9C4149D | 09F72A7FB | 0CC6F4F74 | 2838C3FD1 | 08E87689B |
| 70 | 212957CC2 | 03DD3475B | 044836A0B | 2463B52C0 | 0342FB4B0 | 34AD95E9B | 2936E2045 | 3B0592D99 |
| 71 | 2922BD856 | 22E06C30C | 390070AED | 09D6DC54F | 3485FA515 | 064D60376 | 07E8288B3 | 3DD3141BF |
| 72 | 29CB07995 | 007EE4B8B | 16E787603 | 07C219E93 | 1031B93DD | 23DEFF60B | 30F1D7F67 | 0EFE02882 |
| 73 | 11F3A0A2F | 38C598A57 | 3FE72D35B | 1F655E0D1 | 0B3AC0D92 | 3430DDB1A | 3BAADBF42 | 02D6124C0 |
| 74 | 05FC8085D | 345A5C470 | 07DAAE1E9 | 0D7150B88 | 25D2A5B10 | 16F8E5021 | 3240EFC71 | 0F0F5922D |
| 75 | 399F32F6E | 2EEB17A8E | 0D61665D0 | 2138EE96F | 3F8119063 | 01B5048F7 | 27075153D | 265DF8280 |
| 76 | 3962CC581 | 2337D2983 | 286FD7BBA | 185126EA8 | 1F95AD927 | 07F7EBC374 | 1E3A4B6FF | 20CA9B9BD |
| 77 | 1C85C13AF | 290C37167 | 1FDD26E8F | 0C38736B8 | 0174DB972 | 0A921E3CC | 097557C9D | 09452C1E6 |
| 78 | 2D48D6C00 | 2D9BC8DFE | 10FF1E128 | 25C96BA85 | 0FB071B8E | 0F09B3C9C | 1A3E11441 | 38EDDA03D |
| 79 | 396B88B2F | 0029F4BDB | 30D098CAD | 0D54D12CB | 1D0823F55 | 2DC53B9AA | 11BCF7438 | 33F6EC091 |
| 80 | 21E03CD65 | 1A2FE5B92 | 2851F8445 | 0251E386C | 1468950D8 | 1A8B39748 | 001B42236 | 26CD82DA5 |
| 81 | 2CEA1E6BB | 006C97E74 | 00C2B887D | 23461AF95 | 0E9CB2BD2 | 0B0EA3022 | 1FB56A7A3 | 25A7FA625 |
| 82 | 208FC2A1F | 381C5733A | 03F11D7E3 | 07ED6A7B7 | 1FEC85E09 | 3D61E0440 | 356F4B1C3 | 3756E5042 |
| 83 | 2061E47F0 | 22EAA0AD3 | 24796BB65 | 03C59B4D8 | 32A75E105 | 22155381B | 23E5F041C | 155D2D7F9 |
| 84 | 381AFFB73 | 212B5E400 | 1F1FE108E | 04BF2C90D | 3C1A949D9 | 2854A9B45 | 001B09322 | 3A9372CC1 |
| 85 | 058B23433 | 0904C6684 | 158CADB9E | 11BA4B977 | 1854368F4 | 1919ECEA7 | 147F1FD34 | 2E228AA3C |
| 86 | 34857F3DB | 2CB44F7BF | 111A065D3 | 1BEAB392E | 27F081ED8 | 3E67D1186 | 0F6265AC5 | 27716FAF9 |
| 87 | 38EBB8BF1 | 32ED6E78F | 2B0BA4966 | 2188282AA | 00D49B758 | 1765BA752 | 2B50AFDCC | 068C82450 |
| 88 | 234F0B406 | 02FB239CD | 15AD61139 | 2250A5A05 | 1CD8117E0 | 0D849163F | 268C7A5A6 | 22A802020 |
| 89 | 2D0FE8D16 | 0C14E3771 | 07DE5320C | 0640C2762 | 1CBD9FF4E | 37A91986D | 2024DA401 | 164D4A84C |
| 90 | 3225B4D60 | 3013B75F2 | 2A77AE5C5 | 2C25377EE | 03C8DF835 | 346E80FCB | 116B79FA5 | 356D2B604 |
| 91 | 0D55231FD | 247907F31 | 0CFA0B049 | 36D069A95 | 10D4CDE71 | 1A32544D7 | 38336885F | 173ECC08D |
| 92 | 207420EAC | 26FCFE182 | 3FE7B31C6 | 15B320E13 | 187AA34A8 | 1B52253BF | 1FA16669D | 3725A81A5 |
| 93 | 3C9C7404A | 092B77FEB | 3B9865B46 | 349456F61 | 39B7C6A66 | 3075EC990 | 01BE637DF | 330897B17 |
| 94 | 1CA4C048D | 2B4D50621 | 2BF917627 | 3EA2CC5E1 | 33EC0A1E3 | 05FE0F747 | 349553D72 | 396077301 |
| 95 | 04CEC1C82 | 1F828DD00 | 30122C790 | 1AD8A7895 | 1CE0912C0 | 298382F37 | 2D4D33F06 | 001364B36 |
| 96 | 37F8BB035 | 2F0897994 | 333F5F096 | 0F28AB363 | 20036829F | 338017E2D | 3A5A05D76 | 0CC02E5E0 |
| 97 | 02FD351E6 | 03E316288 | 2FCAEB4F8 | 1C5A80CE3 | 3D3AC3FDD | 3E456746D | 119A5381F | 1581C894E |
| 98 | 1623B3D0F | 103224DB0 | 0FB936BC8 | 2EED7F082 | 26C91513A | 2F12E4C31 | 290F3AEF2 | 392CBFF67 |
| 99 | 02F75DE8F | 2E61A834D | 02A692866 | 1F21044A3 | 2D7881A95 | 18651EE05 | 11FE3D308 | 39EED56DA |
| 100 | 3A858659E | 2F7A87BE0 | 135FD561D | 27B3B651A | 05E131CB9 | 0D5865123 | 2CD6991E5 | 3EE6DF705 |
| 101 | 3F3B247E1 | 32D02B245 | 16B98A593 | 1E4CCFF18 | 0C4A9D285 | 06D519FE2 | 023A336CD | 1B20E999E |
| 102 | 3A9E8B49B | 239656AD1 | 3396D1C51 | 06F4DCF40 | 15D819D3F | 2A3061144 | 20BD2A33E | 2FFB139CD |
| 103 | 38622F3AF | 24BF9BB7F | 1D2729010 | 15877B93A | 00376B0E7 | 0FF064887 | 3505CFD9B | 354C366B6 |
| 104 | 2A0AB7033 | 1AFA65DE1 | 1198D0AD6 | 38E80C86A | 27693D541 | 3BB26F3D4 | 39154881C | 0E7DD6B6B |
| 105 | 1B0DE4333 | 27FE0F6D1 | 0F00B2888 | 0BDA322FF | 2759B5A4F | 0543A2D27 | 0C36DD1E5 | 04E9A262D |
| 106 | 1C7E636BF | 000E9C271 | 2B44F4F30 | 28255BF77 | 1CC4D69CE | 03F4C57B2 | 3E926D59B | 00AA39BDB |
| 107 | 1FDE98AE0 | 0CD076B07 | 171124FB5 | 33F098288 | 1E0B3043E | 39731D117 | 3E7ABC2C8 | 19CC50279 |
| 108 | 28EE855ED | 2A704C371 | 03288F4B0 | 3C83E26C2 | 0A905148B | 18C66BB94 | 1BCC32537 | 10D71AB44 |
| 109 | 26238A065 | 0FBD7BCDD | 02507CF76 | 059F69484 | 3FE0D6F77 | 2466A50DB | 3C07A75B2 | 2DC0F099E |
| 110 | 3CDCD6CBE | 1446783DA | 1626C83F9 | 2FD4CD4F3 | 13A59A2D1 | 2C903D2A3 | 0FD37F076 | 0B1039EDD |
| 111 | 043B07DD7 | 28D9C2155 | 2CCEF57A8 | 34254C1B7 | 09B933B2F | 1FA410127 | 10BD5E9E6 | 010EC6389 |
| 112 | 345E8FCAC | 226B7EFA | 27341A51C | 23854F031 | 04C297212 | 044DED8E8 | 319B3BFB8 | 37DBBBF57 |
| 113 | 16FBEFA72 | 1B5EF9484 | 2DEE7A5BF | 097695C12 | 08AEAD5E8 | 3DA7C1327 | 2B81F3E2D | 31AFBED32 |
| 114 | 3484086B1 | 2DFA56B9E | 226E8AFE5 | 285F45848 | 3E69AC6E1 | 1CB33645F | 2DE53BC30 | 2F6ED567E |
| 115 | 1117B5E7D | 122A4D471 | 1AC936544 | 267010D71 | 10428CA47 | 24B72A000 | 2E27FE185 | 1E62C1403 |
| 116 | 0B3161E37 | 038C3DC98 | 100793647 | 1A95D8D36 | 399668787 | 06C0D4922 | 25F48AA58 | 2DFFF1789 |
| 117 | 04FEF7231 | 381910B63 | 298783078 | 30CE5EC1C | 29F6F299D | 3C34CA770 | 37BAAB139 | 3D2069B65 |
| 118 | 18F644052 | 2051800EC | 23ADBF949 | 04237280A | 18304E663 | 287364FFF | 314698D78 | 149A21E51 |
| 119 | 39E14BBCB | 1DBDA9EF4 | 3ECCAD8D3 | 1BA3EF99D | 26D85CEBF | 270547292 | 0FB3C7826 | 0131E73D6 |
| 120 | 2DD6F3F93 | 0FC282088 | 14A143DDD | 0AB840813 | 0B973037C | 29535C9AB | 0DF8DA2AC | 271CBC095 |
| 121 | 1C1D063F9 | 3F4EF6DCC | 00128D932 | 145E31F97 | 0B21590D1 | 38F1602D8 | 3AC2EBB74 | 2320957C5 |
| 122 | 3383C846F | 12128F29B | 19985CE7D | 2834CBBF2 | 1E1513B3D | 364DB5800 | 33EE3F46C | 01A865277 |
| 123 | 0129D260B | 238A85BA0 | 2D81AA924 | 391704866 | 36F857692 | 1D2F813C3 | 0505FB48B | 3DC438BC5 |

TABLE 2-continued n = 0: (Segment 0)

| | blk | | | | | | | |
|---|---|---|---|---|---|---|---|---|
| q | A | B | C | D | E | F | G | H |
| 124 | 05E0F8BDC | 3D978C1F1 | 266F83FCA | 0E89D715A | 01821DEA4 | 12D9AE517 | 22F8EAC2C | 3C098DA58 |
| 125 | 1575D1CE9 | 26F291851 | 3A7BB6D2C | 12CC21A3A | 2975589B0 | 39CF607FF | 388ABF183 | 3D3BAAB0B |
| 126 | 101E5EC7A | 0B75BCF3B | 13ED25A86 | 35FC032B6 | 2F6209FF0 | 13C7B2041 | 1F2791466 | 3A759A6C2 |
| 127 | 1EF89091A | 11A653D2C | 223FC1F42 | 2F7B97B31 | 2CA4EE011 | 00F68767D | 10FE34682 | 018339212 |

TABLE 3 n = 1 (Segment 1):

| | blk | | | | | | | |
|---|---|---|---|---|---|---|---|---|
| q | A | B | C | D | E | F | G | H |
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 05A0B2E2E | 0B603C09E | 117AC5C94 | 2D9DEA5A0 | 0BDFF0D89 |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| 9 | 29F162A99 | 1F739A8BF | 09F684599 | 1BEC37264 | 38ED51986 | 286325300 | 344FC460A | 3907B1161 |
| 10 | 0E4616304 | 0FABDCD08 | 0F6D6BE23 | 1B0E7FEDD | 0047DE6C2 | 36742C0C6 | 2D7ABB967 | 10D5481DF |
| 11 | 32DD51790 | 237D6ACFA | 2F691197A | 16724EA58 | 149143636 | 3810C6EE1 | 3A78B3FC6 | 1B1259333 |
| 12 | 1BB0FD4D3 | 235F10A55 | 1C7302A27 | 1148B18E5 | 04F25FBC8 | 2A0A8830C | 3646DBE59 | 2F25F8C30 |
| 13 | 0FB38C45B | 069DF29E9 | 00F93771B | 3AA35746D | 2CAF48FD0 | 0A42CDD55 | 19A23CE8F | 26318A30F |
| 14 | 365FBEDAC | 27710945F | 2AA367D61 | 05A484318 | 2563F27D9 | 2D37D5C00 | 287D18FBB | 3ADB44805 |
| 15 | 3038BC77D | 2A45D29EC | 156173792 | 03EC7679E | 07577E1A4 | 1B6A94A74 | 1D26E5A94 | 0FD878D5A |
| 16 | 1F22158E4 | 3F02A1D37 | 2767EC03F | 1C8CD535A | 23DA2E5AB | 2D5F25A59 | 0971AA889 | 3E78C1846 |
| 17 | 16521E709 | 12C2DB8FE | 3A596C221 | 1562D5C27 | 1D9E1F39A | 345B96872 | 301C7894E | 2797F032D |
| 18 | 2EC951A24 | 1ED768F3F | 11217930A | 39DB44855 | 36E41B3FC | 0F6E48C44 | 36254C517 | 14493C673 |
| 19 | 3EA159E72 | 242109E6FE | 3458C73A6 | 30674E1FB | 242109AF2 | 24DAF32B6 | 24B1EDFFE | 291CB9D15 |
| 20 | 2AD0E6696 | 04F4077D9 | 1BB279A53 | 38957605B | 379B7A6A0 | 0BAD35616 | 1285EAE51 | 37425C7FF |
| 21 | 083637980 | 34F2ED66F | 282846A88 | 19D5E40A6 | 21205942C | 27AC551E9 | 0F3F4C262 | 0505FB522 |
| 22 | 3E7D64856 | 1DB0E599E | 159120A4B | 1FC788139 | 235C454FB | 3CE5B67C8 | 339EADB32 | 0F9F7DDC1 |
| 23 | 3956371B8 | 1D67BE6E5 | 1EFCF7D53 | 041A5C363 | 2E281EB3F | 00AF8A1ED | 2DE24A56F | 1332C0793 |
| 24 | 0818C47A9 | 1F945634B | 1C5ED3403 | 1043B5BF4 | 149702D22 | 024CBB687 | 34B01FA8B | 1E9F5992F |
| 25 | 3A6618167 | 3A0007886 | 3EDB5756B | 2F2FA6FCD | 21A5252B8 | 396FFAD9D | 05347B60C | 2E0ECA200 |
| 26 | 0D45F89A1 | 3F9C2C26E | 1CBCF809E | 3CBE5FCD0 | 3D2DCF245 | 14F351A1E | 224F5B3FF | 2AA6ED34B |
| 27 | 3BA85ADF8 | 282005732 | 3AD7C0223 | 2E73D1800 | 23DEA3F46 | 2275280F6 | 1586270F9 | 0CEF4287B |
| 28 | 07DFE662E | 314B74F2F | 397BDDC4C | 223A8071F | 1F5BE3BB4 | 093BB1F33 | 0FCA2D129 | 21B3526A9 |
| 29 | 39FEADC12 | 0ECE1CD67 | 206228FAA | 38FCCA606 | 0C5EEE08F | 1C1BBDD4E | 1459E42ED | 11FD64ADF |
| 30 | 2735FFB20 | 2AE9B244A | 1A5AED974 | 38FCFD5CB | 20310DB81 | 1C5FC3E24 | 19FB3BA17 | 3785BE865 |
| 31 | 24FF6B7EC | 01C682673 | 19CB14113 | 2C8CD3C2A | 066225853 | 02CD0A23B | 279B54315 | 0CD571063 |
| 32 | 015E28584 | 30B497250 | 127E9B2E1 | 2C675E959 | 05F442DEE | 394AEF6E2 | 079E5C840 | 12703D619 |
| 33 | 3CE4B1266 | 35270B10F | 03549C4B3 | 3B3E6C375 | 1DBEF270E | 0042C9737 | 049522EC6 | 24961653E |
| 34 | 34176CD90 | 2B5E9EAE1 | 1C95E3C2B | 1EF541D4D | 26D1450E6 | 3B9D895AB | 1B0C84349 | 104B6B428 |
| 35 | 07A813421 | 2B39EAADC | 33553571C | 0F8046CDF | 2CF6A7F23 | 0AE3BE8C8 | 308BFF531 | 2DBC0F9E3 |
| 36 | 168276972 | 2CF41744F | 3CF2512E0 | 0F8B68ABC | 2E609F6AF | 04E03AC8C | 0F9B66F49 | 3AFE28736 |
| 37 | 03456021F | 1982574F3 | 0BB2B3F49 | 15A4A1CDE | 15487D58E | 2907C9ABB | 15C0D2D73 | 28D8CFEC3 |
| 38 | 3D3FD677C | 33AF2628F | 3D217FDCF | 30027E85F | 0A463F23B | 2F2AE8324 | 1D1E945E0 | 2EB355D28 |
| 39 | 3BCAF9076 | 3A7D2FF70 | 3C541F38B | 249BD8A94 | 287BC4833 | 141391EB7 | 05B6443D0 | 2FEACC5E7 |
| 40 | 275F118FA | 3A96B346D | 0C713CDE5 | 02F394A28 | 3EBB1D18D | 1BE7A9FDD | 223C53CA1 | 2BF040F77 |
| 41 | 1161DE4F5 | 0544F9DB7 | 230847E45 | 322AF4E17 | 26944A0B4 | 3299F1420 | 1C9405B8E | 2DBABD4CE |
| 42 | 33165C531 | 268FE9B9B | 081A914B4 | 39100772B | 27DBF03E9 | 3E3A18AB0 | 13F2D2B83 | 2CEEE5FF4 |
| 43 | 275F97006 | 0A578F2EF | 16CEE7EC8 | 38A5B0084 | 00DC9A1F5 | 1B88CFA3D | 0D8B0B8EF | 29FC4CCF2 |
| 44 | 04BBE4F2C | 1546C3988 | 237105A43 | 339042B36 | 3A5DEBE2B | 1BD8D09A49D | 38EFF588B | 1CDD3A6C0 |
| 45 | 002E32D38 | 1E85D3125 | 3F51120D7 | 00420ED63 | 3384713AF | 1D941BD34 | 2B39EA9CF | 05B6D9E94 |
| 46 | 2B3100F7B | 335EDB2E6 | 1AC8C8EE4 | 337FF7139 | 0672D7995 | 38A54856E | 0124753F2 | 3A3560851 |
| 47 | 046207CE9 | 0FE1BC312 | 09BA5B289 | 39376EF2B | 33F826C2C | 2F6531496 | 3933B8616 | 23125B50F |
| 48 | 3E5849C45 | 01EEDB390 | 141D9A024 | 2DE07E565 | 1813D12BB | 36DB8D404 | 0E8A272AB | 3A66B71AD |
| 49 | 1A2A88A4C | 3F0C9B4DB | 266CFBDF9 | 163420CA5 | 281ABBE99 | 34771C295 | 3AC051848 | 3C53CB875 |
| 50 | 16F795184 | 3466F1FFA | 1F433B456 | 1DDF13810 | 25F58CF69 | 1DD6CFE4E | 10A236FDF | 12AE697ED |
| 51 | 1C8D17F4F | 07C43B7D1 | 1C8DAD395 | 28F6C112E | 3A336ADB3 | 0EB6889AB | 2783A6A1F | 2CDA40458 |
| 52 | 16044624E | 252AA04B2 | 11484E85C | 07F5024B7 | 286E3A67F | 2EE6BACE4 | 277F1F864 | 22F53F57D |
| 53 | 2D1A3F4CF | 0EEB6DEC1 | 30CD76F42 | 20403D1AC | 3A72EF9D6 | 1DAAF2A39 | 03AB76CE0 | 0A2856267 |
| 54 | 0FA2A786B | 38273EDF2 | 228A45016 | 0309DF52D | 093BDAEDC | 1B11E9300 | 1DA9C5324 | 03365EB1E |
| 55 | 24DCFDC06 | 11CF909D6 | 2FF693F4C | 366338F1F | 22E641569 | 0ACA60D55 | 32D1B009E | 035472E09 |
| 56 | 17F5D6662 | 062FCF913 | 35B211035 | 21ACE73FB | 3B4148706 | 2D0CD106F | 2CAB457A4 | 103E1E49B |
| 57 | 21859E8DA | 2F1E3B3D9 | 1F1014BE2 | 062A3DEB5 | 354C0C786 | 05A8982D4 | 35A758943 | 346EBA72A |

TABLE 3-continued n = 1 (Segment 1):

| | blk | | | | | | | |
|---|---|---|---|---|---|---|---|---|
| q | A | B | C | D | E | F | G | H |
| 58 | 00CB49E5F | 211B1034A | 3A5D2DAF1 | 21D3F3EB0 | 24B2D1150 | 1097C3685 | 2AA3671CE | 0E5DC1308 |
| 59 | 24C8401BE | 217B1F994 | 1FB9664A8 | 3D5057708 | 05A506088 | 1314842B9 | 3C8657064 | 14B1FA77F |
| 60 | 2AD698E2E | 3C129D1F6 | 2C744FF4E | 1C1C052F8 | 18C38A9FE | 252168A10 | 2EB68D098 | 3A001CBD2 |
| 61 | 2AF71324C | 2BF41D408 | 0FC498E18 | 149A1A407 | 0FDC2C4A3 | 19D00C4A1 | 0F6B0DD29 | 268CF8E86 |
| 62 | 19F4D82A5 | 342C73FD5 | 0F5AEEDE7 | 21A2A8953 | 15ADB7A94 | 11DBE038D | 0A5B6634A | 0FA382B77 |
| 63 | 0A5985778 | 35AC3032D | 35691C85D | 2829D55EE | 04A3FBD8C | 2C85BFA8E | 0F459B864 | 3E878F0BC |
| 64 | 10C785EB0 | 054D4CE18 | 1BF657A8E | 101DC64EF | 0B4E3032A | 24ECFD9C2 | 00C98BE0A | 2A1F82444 |
| 65 | 300E8B09C | 31A079FB3 | 0C41DEC5F | 216CCFE4D | 226C5A693 | 3C31A41DD | 3A019974C | 23B64EAFC |
| 66 | 249BDC80F | 0316ED79E | 1E42B5567 | 0CFF04A4B | 310678543 | 34D986980 | 1E3195429 | 280966E65 |
| 67 | 359A72B64 | 186A3999D | 065825DDF | 2D28E6000 | 10964C1E1 | 1468C970E | 34C8B606A | 33CC94DB1 |
| 68 | 370B29C05 | 12841A9E8 | 2147E7160 | 1835345EE | 06DB43F37 | 33854A725 | 065E6614C | 151E2D7B1 |
| 69 | 0EAADDB27 | 004EC6DDD | 30AA39B8B | 2AEB34AD4 | 2A13D6649 | 00EC67B83 | 1176417CE | 0E3683151 |
| 70 | 0832BA87B | 3B67515B9 | 0FD34BC87 | 1688F83CB | 370B52AD5 | 3A2CD6F3F | 3343BF461 | 37BD48546 |
| 71 | 16EA2751C | 1799D9C42 | 24055CEC9 | 226A907D4 | 133C68F80 | 22CA03BF0 | 05F723395 | 2D35008AF |
| 72 | 122A5C67D | 3E46230BC | 09F475BA9 | 15B4B6754 | 11DE75C50 | 28C17544F | 1D85FAB8D | 0D5AD9537 |
| 73 | 1C5497CD9 | 3D405F487 | 05535D737 | 06952087B | 1C4744AF4 | 3E0EF881C | 3CED3D1BB | 1D91157CE |
| 74 | 1D276153D | 14604EA77 | 1661FB979 | 3BAC5E9FB | 089F41406 | 283154122 | 2AFDCE892 | 1FD5E0810 |
| 75 | 2A620F4C2 | 0DE484180 | 2D05E6458 | 3E6D15A27 | 0A92FF0B7 | 2CBF7BF53 | 25A2F28FA | 19A10CE02 |
| 76 | 3A77B1FBE | 2B262F810 | 2BEEA0F46 | 39706BBA2 | 09257163F | 1026D5D74 | 2E2483EBF | 1D6527C1E |
| 77 | 0DC1EBA02 | 383C59C77 | 28C7ED115 | 06FED31D4 | 16F610DC3 | 000890B82 | 2FAD16A3A | 35C9AD95F |
| 78 | 3E5C1EBE2 | 3C65A7691 | 2394005B6 | 251B1BB49 | 1F42BFA23 | 0E8608C07 | 24666F55C | 11A5214DF |
| 79 | 323E882C5 | 2DBFF5E13 | 3638BC43F | 38CC5CBB5 | 1DBF783FB | 0499418C7 | 2285E5A40 | 1A61D17E7 |
| 80 | 1E508F19D | 0CF345F97 | 0E5648601 | 0A0951EF3 | 1194EE717 | 0A6C0B374 | 03C4E19EC | 06F725799 |
| 81 | 0B54F4AEF | 186A12343 | 04C4A60C6 | 27C2CC0E9 | 3973075A1 | 392C5EEB7 | 3933C99B1 | 005F98CB2 |
| 82 | 021B6635A | 3764D0696 | 20942B266 | 0155C4EDD | 3FDBF7497 | 37356D442 | 374F3DB06 | 2718357FE |
| 83 | 120DF6F80 | 0E41F376A | 03544C7B2 | 2D6795EFD | 29E8811F1 | 1B3EFD388 | 01CA4C48D | 2067E8033 |
| 84 | 07703D649 | 35221AB50 | 22141A0D7 | 268061A59 | 2D9192B05 | 3834711FF | 3A07258C0 | 36253B5AA |
| 85 | 1C4A564C1 | 26804247A | 16A4DB29D | 0BEF93C88 | 37A3EAB6C | 25547B136 | 3FC935878 | 250E3BF1C |
| 86 | 17049BB43 | 0D6426761 | 2BF3A471E | 1665820E9 | 14412A13D | 30D5744B0 | 2ECE5CAE6 | 01395189C |
| 87 | 29615B890 | 0A2C5A664 | 216DA64F4 | 3D4AA9D2C | 07B98342C | 2603F0D76 | 0574BDFA8 | 3F9B35D5D |
| 88 | 3A0414B22 | 0A8BE885E | 155C220E4 | 2D3B17AA6 | 3017E1B48 | 26508C6C8 | 3FF25EC63 | 240EFF072 |
| 89 | 2ACD81CE3 | 0468D7943 | 2A4108121 | 1F2E8E67F | 3AB446179 | 33325CA24 | 3006DD3A5 | 1A33F3A2C |
| 90 | 2B038BAF7 | 070660C4E | 30953C7B7 | 3E7375D04 | 1D6A39944 | 001BE5C8D | 199A89253 | 0A82087BB |
| 91 | 03BF7C836 | 2CBF9FC48 | 38EAB1C98 | 11C303993 | 3D748807F | 1EBD41D17 | 351085EF2 | 1C55B94D3 |
| 92 | 116E0BE61 | 17BC8C403 | 31BD1EAA2 | 1CF87C049 | 2A41CC04D | 3883EFEC1 | 3971BBBE2 | 190CAE3B7 |
| 93 | 172799BB5 | 3301DB193 | 2480B569B | 34DBEFE9C | 003287827 | 38DAEA1CB | 0B0E25BB4 | 1972B37E3 |
| 94 | 3EF1F9EF4 | 189D8C3E0 | 1941998D3 | 259838BC9 | 28E545988 | 33BFC60D8 | 3572B10F3 | 197913B6B |
| 95 | 24CF96D66 | 285347801 | 22BC70E5E | 394231BCC | 077583F4E | 0364420AF | 278FBF5CB | 3850AFC8B |
| 96 | 1B38C4A50 | 04439E0B5 | 3A7BEB18B | 3003A36C0 | 329D5A2B6 | 1BB123AFA | 049C2CC94 | 0F604D1DC |
| 97 | 28D47EF33 | 24CF66B6B | 24B716FA9 | 34ED7F6BB | 186AE44B4 | 1380D0726 | 1CC51324E | 16BA74F62 |
| 98 | 04422E60A | 3424BA16C | 3FF1B39DD | 1A1E658F7 | 33457317D | 14E822151 | 3EC02F279 | 28593D11D |
| 99 | 0F2DF0912 | 21BBFA838 | 32D634EBF | 2061148FD | 09A565B74 | 2BCE430B7 | 34DAAD9FA | 228ADAFE5 |
| 100 | 2D7EE0544 | 25D57B7CA | 0FADAF20D | 19B4F6444 | 3A75DF1C1 | 0AD3EDD56 | 0A4D61EEA | 28C1262A5 |
| 101 | 1B6AEE253 | 0BFE02772 | 24AB19547 | 186A377A5 | 03089B4E8 | 128955F60 | 3A8DA9AC8 | 2931648B3 |
| 102 | 21BE0200F | 00F34B4F5 | 34FF3261B | 1A0E27AED | 0A821AEFB | 21B0BA404 | 1C6A644A4 | 1734EBB33 |
| 103 | 201FBFD73 | 0592E9D86 | 053D87C9D | 3CAFC7479 | 22F1BA3FA | 3DB25DD15 | 31D468990 | 22FF2B539 |
| 104 | 06C77404E | 18AE64252 | 3963D899A | 37179C03C | 0FD2E3D04 | 191E64DBB | 380B841FB | 368E1DEAA |
| 105 | 3A561759B | 156243DE8 | 04325D217 | 33993D0B0 | 0CEAC2109 | 002242D1B | 33C1D9F5E | 1EC4195D3 |
| 106 | 17D7A9B74 | 1F44ABA75 | 17B572FE3 | 096008B9B | 1F1E00AAE | 05489F7A1 | 17A4C131D | 1C018E923 |
| 107 | 0A4ACCEC8 | 1F294A309 | 19CAEE64E | 002787A1B | 03EB3238D | 27C10F626 | 1C9E656A0 | 3F73609F0 |
| 108 | 1E0E3C802 | 1B52D12AA | 2F4E003B7 | 23BA7A6F1 | 3CAA0998A | 32E96C916 | 168EFA1EE | 28147EE33 |
| 109 | 1CEC9799E | 215D9302B | 176BB6639 | 003D5E371 | 12FE4ADB3 | 3106B64E2 | 001D9C28E | 0F39059DC |
| 110 | 31570792D | 2260D7FEF | 1AC830374 | 118FE7C78 | 08F982159 | 23BB2B13A | 2C7944305 | 376396F3C |
| 111 | 2D340540B | 272E94D06 | 097C70995 | 0E70DDADA | 1DBD644E5 | 341A72A58 | 01CBF5334 | 2C7999AF9 |
| 112 | 3FF17764D | 0701DAD13 | 146BDBB97 | 229D2D7F0 | 03C5DA21D | 3A5916EC7 | 2390AC01D | 197D64233 |
| 113 | 3E9759D5A | 00B237425 | 0B7E646B9 | 190CB4D16 | 2646AA1D4 | 1A373103D | 337E5EFB1 | 0199DE4A1 |
| 114 | 3FD5ADE8A | 26B843860 | 0A2D0AA7B | 3C351E07F | 1B25376AE | 05C553CDD | 1DBC3F38D | 019823A2A |
| 115 | 30FF187B4 | 112F9D7A1 | 1AE977517 | 3760AF555 | 004F86368 | 3700975C2 | 0518029DE | 032427D9B |
| 116 | 3A86D49BB | 057E649D8 | 2FDE33D7E | 31254217C | 30E05CE12 | 10BCC1CD7 | 1889C5139 | 38A163ECF |
| 117 | 2610F5174 | 02A7ACB27 | 208B84FF0 | 14609CA80 | 0F3526318 | 38EBC7384 | 287C57BAA | 279661A9C |
| 118 | 014F6D77B | 1036B3D2C | 294F1999A | 33A059187 | 26CCE0507 | 180DF3129 | 00A6CAE22 | 2AC0F23A2 |
| 119 | 347C62997 | 1912A710D | 2260C531F | 2F54BBEBB | 0A2D90305 | 1BBEE20E4 | 0AF79997E | 2376F3D0F |
| 120 | 04484EB82 | 181977944 | 1C1CC2693 | 227ECAB0F | 23F32982B | 19E2F290C | 1BA2300F8 | 0EFB06247 |
| 121 | 0EC048AD8 | 3B2168495 | 34FC02DA1 | 2C0CDEF52 | 0553CA222 | 25DFA4581 | 29CF66B6B | 0AB9C21CD |
| 122 | 2AF502148 | 3B00632F9 | 387CDC4BF | 3F8B9F716 | 19084CD65 | 0354918C7 | 39D1FD9AA | 0F5ABDB77 |
| 123 | 2C6E2557A | 3E8A19D6B | 3E6756A28 | 237E6E5BF | 24CA57004 | 1D52401AD | 0237F1D80 | 0FB2B335D |
| 124 | 228F4B540 | 07532BF5D | 101F67F52 | 29D8598EE | 0421A0E23 | 2D89C2AFF | 0963D2F3B | 24C472A63 |
| 125 | 0CF3598E8 | 196A40BD2 | 00E63B26D | 088A0BFCA | 1C78E9016 | 03835236C | 33071A836 | 3949DC586 |
| 126 | 3E815D747 | 1588D4E96 | 073C8D44A | 303281AE4 | 095D31EC8 | 1F10F69DC | 200F057D8 | 1F270128F |
| 127 | 34F9ACB6B | 384870FF1 | 257A863DE | 34B36BA0F | 3FA3D216B | 27425041B | 0E0DD0BAD | 2E95AD35D |

TABLE 4 n = 2 (Segment 2):

| q | blk A | B | C | D | E | F | G | H |
|---|---|---|---|---|---|---|---|---|
| 0 | 13F99E8EC | 3CF776C2A | 3300A482C | 0B2BF4791 | 17BECDFE8 | 35998C6D4 | 05F8CB75C | 259B90F0B |
| 1 | 116913829 | 05188F2A4 | 2DB0A8D00 | 2F770FE4A | 185BE5E33 | 0F039A076 | 212F3F82C | 116635F29 |
| 2 | 004EE1EC6 | 18EF4FDD9 | 26C80900E | 1A63FB8A7 | 1DAA917D4 | 0E6716114 | 02690646D | 0CC94AD36 |
| 3 | 06D4FF377 | 2716E8A54 | 16A1720C8 | 08750246F | 393045CCB | 1DBCCDE43 | 114A0CAD6 | 181690377 |
| 4 | 3DC4EF347 | 1F53452FC | 01584B5D3 | 11D96034F | 1FA62568E | 11974FACA | 191BE154D | 397C9D440 |
| 5 | 05A1B6650 | 29835ADAD | 2F6DDABE4 | 0976A607B | 11BA92926 | 2456B1943 | 3E3FD608B | 095E7584B |
| 6 | 00CC66282 | 0560BE767 | 21EBAA7C6 | 2D8E9ACE3 | 198A9E285 | 05F3E73DD | 13DA751A2 | 176B75E43 |
| 7 | 03D08ADC1 | 2254606FC | 3C695D892 | 1DA9E0280 | 2CD4FF589 | 19B78A5A4 | 0CE67A7C6 | 12535A61C |
| 8 | 0984647CF | 0822BA46B | 3EB2BC076 | 212596F54 | 11CC2E64E | 120BADF9F | 0DA72CEDE | 30D0E106F |
| 9 | 083CE5726 | 1F05DA925 | 169D93EF6 | 1FCADF3D3 | 08A5CF0BC | 317C8508F | 19BDCCFE7 | 0FACE3631 |
| 10 | 27583A466 | 1CB1634D5 | 03C7849F7 | 38C6CED00 | 1161C173A | 15A645D3E | 281A7ED92 | 076ADA797 |
| 11 | 33BA1AE8F | 187F578EE | 32473D69A | 2458B703B | 267E59071 | 0F317883B | 3E7DEDBF1 | 3B9859BA7 |
| 12 | 0322609A3 | 20C4C957C | 3FD638746 | 3FB716D79 | 36BD0CF1C | 333B11B8F | 0027ED1F2 | 3E7471BF3 |
| 13 | 3529922B1 | 0ECECBE04 | 1980B9B9E | 38D60363F | 18904BCED | 108E3E5F1 | 34B95C446 | 338F51DAC |
| 14 | 21FD50527 | 0EA2F7A31 | 1E294A159 | 114734A02 | 120B90BF3 | 3F3617C92 | 0129071E2 | 106640936 |
| 15 | 2B59354BB | 275BF9761 | 39C6FF332 | 2004B3902 | 053F9DCB0 | 19D79A902 | 2B3125038 | 20649B43E |
| 16 | 03A8A7A2B | 091AE6721 | 18651FD9E | 1F5415ECD | 1B38A62E | 07FB0F422 | 3EB58896B | 077FE4C7C |
| 17 | 06A13CB38 | 340099B18 | 2AE6D6385 | 1669631F9 | 28E51A676 | 19A023391 | 261855F39 | 3E518F0BC |
| 18 | 2A88F831B | 09D295831 | 294C46ABF | 1477F0A13 | 37725C6EB | 00E7DB222 | 27D610157 | 349A8FAB6 |
| 19 | 163E1C44D | 3F98B6F4A | 1805538DD | 01EE3DB4A | 22AA1797E | 27568753E | 16090F219 | 2C9838C01 |
| 20 | 34B0543DC | 121B8EA82 | 00873B4A0 | 220FE7C05 | 2EDBEAE34 | 1104BDB93 | 0711E8C0E | 0E1C107BD |
| 21 | 226183AFF | 15643DE71 | 04A4CDECB | 2E67FDF8A | 26D2A6D40 | 25E7695F1 | 1A99778F5 | 20FE0C1A3 |
| 22 | 0F7EAC09D | 12BB72B2A | 182E44301 | 2962EB85A | 3477C1B69 | 3E3CF56F7 | 29C9D00C6 | 39788600C |
| 23 | 31084BEB5 | 1DC90E345 | 391736CC1 | 3C8292AE1 | 38A0D515C | 3977012F6 | 25D1F6055 | 36A7D3F8B |
| 24 | 229D3ABAC | 1044BA05F | 0C391B88A | 0636A90A6 | 0B14322AB | 21ADC33E4 | 2DC1A3BFE | 0D7FF6D1F |
| 25 | 33C85B393 | 37BFA31B6 | 134F872F0 | 0C5EA36E1 | 286956ED1 | 1632092FA | 382B4BB10 | 23DC3EF14 |
| 26 | 38E8B9BF6 | 0A0CE666B | 207D98904 | 23FF360AD | 121BFDA4E | 347D442FD | 242922C07 | 23C6E4115 |
| 27 | 263EA8516 | 36138BD6A | 0ED9C55E7 | 3F0937876 | 03232BC24 | 18E5FFF26 | 3530CF206 | 3981B7414 |
| 28 | 1D9AC2E79 | 051B220E9 | 3F3B09EC8 | 0D3F6C366 | 0201A7CB9 | 3D5477092 | 22185FF9F | 1C5AA5348 |
| 29 | 208D85694 | 22104E7C5 | 14BCFD3DD | 3592DF665 | 1F4EC3265 | 24358076A | 2D20A8000 | 017F2D489 |
| 30 | 36B3A9A2C | 3F8E0F162 | 13ACDCCF2 | 16951F727 | 271E73555 | 1B3EDCDE7 | 162B45352 | 1CAFA635A |
| 31 | 2D30FE705 | 3EC9BFC8D | 1B10F8349 | 34F973F31 | 1CA96A349 | 1A28B4543 | 1C5367CE6 | 2DFAB0AE7 |
| 32 | 21D93EB5A | 0E49D6211 | 3C6FCF774 | 09F44CACF | 2D8CD2BEA | 037DDAD3D | 3BBD06D1D | 39CBB996F |
| 33 | 159B1F948 | 0183E8DCD | 3A484866C | 21F8DF1A5 | 219A58193 | 2D1B3C399 | 2275F19BA | 0EFF4C612 |
| 34 | 22EB93A82 | 15047E272 | 15428D77B | 38FFC612E | 20609BE54 | 3226C8254 | 3E5568DB2 | 159284EED |
| 35 | 34529707C | 2E84585F4 | 20DFFB4C5 | 28288AA00 | 10EFC1E07 | 3C4D211FC | 379087C3F | 25716A7DD |
| 36 | 20106354F | 22AEB9FD7 | 3A6BAC67D | 3126294C6 | 0FBC874AC | 2DFE5675A | 391B1DDAA | 06BAA74D8 |
| 37 | 348F831C5 | 2E44BF3C2 | 3D9F6F454 | 20746A30E | 08D183029 | 35C6BFEA7 | 2729B552B | 263BB2EBD |
| 38 | 202D7F08F | 0DBE1C144 | 132F4EC09 | 184CD9B93 | 2596F5884 | 2A55B8217 | 2BEAE02D8 | 235A19A43 |
| 39 | 2DDE3FF5F | 23932555C | 001ED92D7 | 22FCD3D60 | 2C0737593 | 0B27E62FF | 0693CFBDC | 284D5B33F |
| 40 | 1DB9AB8E9 | 2995EE0A1 | 1ACFE9892 | 0D41BCB9D | 2E3806507 | 25CCD5D60 | 3536BF04C | 0BB0A5E3B |
| 41 | 3FFD4DD82 | 3E69CC1C1 | 2BC30FB74 | 3462F70FC | 164FAE762 | 09B83F8AD | 1DF593F3C | 2DB478034 |
| 42 | 16E24E9B6 | 0A9FCFBD2 | 3A018544C | 1ED8E2855 | 0037681E4 | 05950E1F8 | 1107DA097 | 377A25C65 |
| 43 | 03C9138B8 | 0C70A7749 | 0D58708C2 | 0CA2808C4 | 219E02554 | 39315B272 | 2E089B00F | 302E135C7 |
| 44 | 04DC211E8 | 1DD20A505 | 21A50649F | 2CA438C04 | 39CAD66AE | 2E1BD969F | 002748760 | 069924211 |
| 45 | 2E84BCF09 | 226F5D43C | 37BE7EB10 | 07CDC854A | 06FB50D48 | 08966435B | 01BA5E5D2 | 1D34057FA |
| 46 | 2D8DFD565 | 0A30D633F | 33F93B7C6 | 0B330E9D2 | 0E659B262 | 130669024 | 19A9D5F64 | 38059132D |
| 47 | 17E4777AE | 1308F9046 | 2F7C0483E | 1859E0943 | 0982C9101 | 05453D92C | 001F53877 | 388A571AB |
| 48 | 00D29CC63 | 0A6D3BDED | 1CA44D2AF | 388C002CA | 2A3D70EF7 | 2DD3F5A6F | 39FEAF0B6 | 11DFE385F |
| 49 | 3E3A6CEC4 | 122F5E8BE | 360B96301 | 0632CF244 | 2E8985A9F | 0FD256C87 | 0449C29D4 | 26B713C90 |
| 50 | 238150687 | 3D96F7F7B | 0091E6D18 | 21802352A | 02F7A466E | 0A5BB6648 | 350DA85DB | 1C97F4544 |
| 51 | 306BA76DE | 379A88697 | 3F0DA31E1 | 0EBF48C71 | 27F8A46EB | 3F75A19C6 | 277002F97 | 275B43715 |
| 52 | 24D946CC1 | 38DF102DC | 3EFE1F5B3 | 3C316E148 | 2735B20CF | 0688E430F | 0316DC923 | 24919BEA1 |
| 53 | 0EEAF72D2 | 3C7248573 | 1087A7BD6 | 08EDA9BF6 | 2B5D97BF4 | 26733DC60 | 1190D275B | 2EC7ABD30 |
| 54 | 37C6AB63E | 2FFC9C790 | 02CAA37A7 | 1B34A3F84 | 0022CD5F6 | 3ECF891BF | 193D545E2 | 0172C674E |
| 55 | 0848A41C3 | 1D8150EE7 | 3D8A8549A | 2595F707B | 00640B276 | 2D44EBDAE | 1CAF37453 | 377EF590A |
| 56 | 16B7A5F7D | 1F5AA7998 | 382300A8B | 218916E53 | 19D00E728 | 1EDA11790 | 0BBDEF9C4 | 1DEB15796 |
| 57 | 3EFB3368D | 392AA88AD | 29CF3CACD | 03F59ED8A | 1042098CA | 1721B8F3A | 2B5DE9312 | 0CB5E6F23 |
| 58 | 1A8B0FB9E | 3FBC09C8B | 3D7F3E248 | 034C9BCB5 | 1BDD89300 | 3392476C0 | 0C10AED4B | 23BECA42A |
| 59 | 0EBC749B6 | 33453C7F6 | 304735F5C | 334628143 | 1DAF6E7A9 | 11BB9C393 | 226C5E4FF | 170372039 |
| 60 | 3F9262CBC | 0693308C8 | 21B563415 | 09BDCC403 | 0112C79D4 | 2DA9F1134 | 36AA1CD7D | 3A1608BFC |
| 61 | 218AC590E | 0FACC734D | 02132C9A3 | 27087557E | 076B3ECE7 | 2EA16BA3D | 0E1D452F1 | 3F70B027A |
| 62 | 004F9DC68 | 25BE3AD9C | 2CBD3C07B | 3F9DECD71 | 3E771E15A | 11FF2F24D | 2AEA5DF67 | 1E838955D |
| 63 | 3A04BC376 | 1D19254F1 | 00F92DD2B | 3C57484F3 | 181D0973E | 319F9CEEA | 053ADEEDB | 1A3C22150 |
| 64 | 0F7B8A6BC | 2DFE0E681 | 3035BD77D | 0A0FFD148 | 275F50C66 | 2246B9053 | 27B2BF3E9 | 1741894F8 |
| 65 | 1ACCD0F79 | 22F0AEA4F | 32796ADB5 | 134A4A876 | 183D989E3 | 204C4BF97 | 22300E86F | 3F18744A3 |
| 66 | 3EB6E19EF | 1B24EAB88 | 2E318F810 | 3F07B618E | 26B4C0C87 | 31CC10EA8 | 169E1B650 | 017DF88ED |
| 67 | 2BD9E8FED | 0AB104122 | 30C9D81A0 | 09EA73C7F | 141357B1D | 000A7DB48 | 1DD06FD41 | 0AFA8EF72 |
| 68 | 19CA5678F | 28A89AA43 | 1DB945917 | 262AF69C3 | 3145A4473 | 3742DBFF5 | 1BCD965E9 | 1B0E7FC84 |
| 69 | 077838B25 | 2BF7032F8 | 23DC2E014 | 028544277 | 37B411B5F | 392FF6CDC | 1D66F2BE9 | 011372DA0 |
| 70 | 39596216C | 05A651F63 | 183A6AE26 | 0D1FCA203 | 0FF6F0D22 | 2FEB8364B | 05A438ED8 | 32D045F13 |
| 71 | 3711AD513 | 290B237FF | 20E2A9B26 | 0C72A0234 | 2F1ABBE93 | 19B505378 | 354ED915D | 0C359F272 |
| 72 | 1D7786BA4 | 1CCDF053A | 36828B333 | 0ED27AFB6 | 241326FC4 | 1A9C37F8B | 0A9C3C372 | 05937E898 |
| 73 | 1053B9CDB | 040B97B1D | 0D4FF481D | 23AD465A8 | 2906EBDE2 | 0C4F6C09D | 2189C5FEA | 2D90D305A |

TABLE 4-continued n = 2 (Segment 2):

| q | \multicolumn{8}{c}{blk} | | | | | | | |
|---|---|---|---|---|---|---|---|---|
|   | A | B | C | D | E | F | G | H |
| 74 | 39073122B | 35FEAA236 | 1B38B7A90 | 2E02AB9F7 | 219FEEA0A | 36B3B2EF8 | 39A3F4C8B | 15A42C9DD |
| 75 | 2C6326A9E | 33F7536C1 | 2A120C75F | 37030CAA0 | 3A011882C | 098C8504E | 3B92D756B | 175811CF9 |
| 76 | 38A0F736B | 2BD9E9C32 | 3B989715A | 2A646ADF4 | 2D02FE38C | 11AC7E9E6 | 3F5464862 | 0F382B0D8 |
| 77 | 26897D80C | 145B21D3E | 143F5E320 | 30549707E | 28126710C | 122CA92BE | 3AF47270C | 0B544128F |
| 78 | 00E931208 | 2E1E75EAA | 374C36E5F | 21724DFC5 | 1DFCD2028 | 1B3FF774E | 3A826A68B | 1781CDCA4 |
| 79 | 0C3D7268D | 0B7A26BF9 | 1587CE5CD | 1D04E1E60 | 36240C07D | 1AC403449 | 0417F9622 | 02B9F8BED |
| 80 | 1B569F488 | 08A3F3A46 | 377F03A18 | 2DE416045 | 1ED96E381 | 33F4F16DC | 2C8DAAE4F | 33E384AC7 |
| 81 | 13F709786 | 02A4E32CB | 14C7F849E | 09EA16987 | 06C849EA4 | 219E4B995 | 243CB7F07 | 253513BC6 |
| 82 | 09B83FDF2 | 119D60439 | 278290BFF | 2483E6F2C | 0EDEC175D | 242A669C1 | 3EB639EF0 | 31EBB4CA0 |
| 83 | 22CAEF0E4 | 0B2FCDED0 | 19BA79607 | 343F81C7B | 289AA213E | 358AC9FFA | 23956ADA1 | 00BC725E7 |
| 84 | 1186F95E3 | 2F95F4048 | 3CFBF41E2 | 1D1E4BE96 | 26B38BA65 | 2F715E590 | 2235C0029 | 2C89AF93F |
| 85 | 33437ED6C | 12F14DB69 | 2E70F5611 | 183752704 | 142BC8B34 | 3B90ECD86 | 1C11EB493 | 1022D4782 |
| 86 | 248457F60 | 05B9A28A5 | 0A2A5DD56 | 16002D9E7 | 34C87FB16 | 2E32BAE0C | 21065BD64 | 1CCE92BB0 |
| 87 | 1DCE3941A | 1D940ACE3 | 30D331B98 | 3D5A3BAB6 | 119791607 | 10FB0D788 | 2C78E9015 | 100B598E4 |
| 88 | 39C0BC811 | 1B886594E | 27AF50C73 | 2DCEA05E6 | 0805EDCA9 | 3A5989B08 | 18AD24255 | 1683B7CF2 |
| 89 | 186A3D233 | 09E8B95DA | 1ED9F3DBE | 1B19A74F8 | 356CA7443 | 316C9FBE9 | 3F8A3162A | 3A0BC11CC |
| 90 | 02F039B63 | 2F02D3E75 | 0F5B5E89E | 3D062255C | 222C6AA4E | 25DEA06FB | 39488C071 | 139318BFB |
| 91 | 27B5B6EE8 | 22154E0BD | 3FF7729F1 | 1052B1947 | 3D477BF2B | 3EDB6745A | 1B30CF849 | 030F84AF4 |
| 92 | 27B2D40BC | 01EE5E9B6 | 24B0ACF84 | 3370F65E0 | 067D8DFA9 | 1C01B9327 | 26FF8FDB5 | 3809C0CA6 |
| 93 | 11F581193 | 0B9B7A7D | 1CA56B4A3 | 3D088CC6C | 11D52C38A | 344760F0A | 3D3AA336D | 0118CBD93 |
| 94 | 096990784 | 2960D1672 | 3BFD7D847 | 2BC297EEE | 32168CF28 | 3912FFF6C | 08ED9BAB1 | 34452C6E5 |
| 95 | 02CD48DC2 | 186403849 | 24C6EE1EA | 12ED5268A | 2718C00E9 | 27E8F18CF | 145913E2D | 0B09009BB |
| 96 | 06B97DD08 | 2880C9B96 | 37EB87E03 | 14C4ED01D | 17041E5DC | 347A412CB | 088CE591B | 0BE926B22 |
| 97 | 116250DF7 | 1745B4329 | 1102B7093 | 1CA549C5A | 25244AB6C | 374E0F19B | 274F76015 | 0FB738F16 |
| 98 | 12841B9E9 | 1F9C4AEEB | 1445F0C98 | 39FFB6307 | 02AB688E7 | 0FD8B499E | 28D533072 | 138F162EA |
| 99 | 22BD9525E | 2030E58C6 | 25F2CD033 | 157D93437 | 1442E92D2 | 3D6EE9DF3 | 3CA5B469D | 0588A0FAE |
| 100 | 0FDEC177D | 2606157BE | 2224E556C | 0C6F33897 | 0F830DE1B | 3C3F9C1D8 | 2AF576923 | 0D4173E27 |
| 101 | 376EF82C2 | 30E3C582E | 0A82DE29A | 1B8D454D9 | 079ACE6D9 | 2579984C6 | 392F28400 | 24CEAEDF1 |
| 102 | 1CD4AA9D2 | 1DD6F4DA5 | 3485B7150 | 105DE02F9 | 22168E0FA | 24F48AA6C | 003771A39 | 306890843 |
| 103 | 1F8303786 | 2C981AAE4 | 0819F22E9 | 0A1D88D55 | 3B4C012FD | 0214CDF52 | 19DF3BE8F | 02364E19A |
| 104 | 1364A15C0 | 16E9F9961 | 17E598810 | 2654E5A2C | 09B43C7C8 | 3A5E2AF45 | 14FC71E26 | 2B4BA69F4 |
| 105 | 12E128BEF | 19166342E | 04A1404B7 | 283D17B66 | 014836F64 | 13BE0B4B5 | 2F8583C08 | 2B19A7FB4 |
| 106 | 19F83FDE2 | 361D25170 | 36354011B | 3FF4EC74B | 1B2128FF9 | 0C849EB1B | 096B991D8 | 1CA7A74AA |
| 107 | 32E0BEF35 | 11A61714D | 34C56D40B | 0742C52FE | 00ED2F1C4 | 3997FC7B7 | 06E414374 | 180DCD64F |
| 108 | 18399ED59 | 224E6C2FF | 3450F1BB7 | 27A1CA959 | 21B5E00F8 | 13B67DAE8 | 0B14C022E | 0E41BBEE2 |
| 109 | 318D94D05 | 2EBB53B17 | 331C3E6F4 | 0FBCD71ED | 380FF18B8 | 3E3C75B26 | 0E0088A18 | 17553D2A2 |
| 110 | 37AC7E5D5 | 27C9EADFA | 3FC47B5E4 | 38699BB57 | 1564F8B27 | 3579C7FEB | 13401BD88 | 0DB519DE0 |
| 111 | 0FF4D6F22 | 3C84242F3 | 2DEAE40AD | 305F320A5 | 244CB97B0 | 0892DA905 | 3F09D5CB5 | 332E7DB02 |
| 112 | 31479E580 | 1B6AD13E0 | 16A1CF9E2 | 33A0A119A | 1AC8388E9 | 3D4105F37 | 226501835 | 27AF1310F |
| 113 | 1CBDAFE39 | 3E5A30C1C | 236E9A029 | 063430D97 | 0CD91A825 | 02F335D7E | 1989FE0BE | 13C4E2A20 |
| 114 | 10B393370 | 33CB79316 | 2CEB44FC0 | 236019420 | 248F95ACB | 35034B6F0 | 365691771 | 34A8FBCB6 |
| 115 | 25463FC5F | 082FC0ED2 | 038ACE1CC | 3E959B49D | 21B8C04F5 | 08633F3A0 | 3A5D18159 | 12B3EC4C7 |
| 116 | 167B32C3E | 06FF88387 | 34C3F468B | 3239005B2 | 121C913AF | 21C90CE16 | 28B54D557 | 3811CB0A9 |
| 117 | 221BD0503 | 0AF619499 | 21FB04C01 | 1B3DA7AEE | 3FA2E3B05 | 348466C50 | 10F12A28D | 0E70B26AB |
| 118 | 1D79A57C5 | 315D2460F | 1402B8222 | 28DC66FEA | 1BCF748F9 | 2AD5D4227 | 0094D2CAD | 25EA22A58 |
| 119 | 062B39CFB | 310E8818D | 0F2D0A235 | 3F6468866 | 33F86F342 | 39CAB5BBC | 2E7D6A8BF | 3E9218162 |
| 120 | 2FCDEA0E0 | 1BDD766A4 | 2827B99BB | 0B5F04CC9 | 1C9E02A9A | 1A6675ED4 | 033497A06 | 07D4ADD44 |
| 121 | 3CD46CD9D | 311A64A85 | 24DDFE6FF | 3411C6FE5 | 0D0613CDA | 0E9276056 | 178ACC4F8 | 23DEA3CB0 |
| 122 | 2762D6A40 | 306FE3843 | 1402589C8 | 382B07654 | 160BA3DEA | 3815B54C8 | 273960105 | 2076A15E5 |
| 123 | 1C593A744 | 1562487F6 | 0C38617B4 | 2CA68266A | 071C4BF93 | 2593F0BDC | 1562436E5 | 199BEEA49 |
| 124 | 35B8C7503 | 278F57EAA | 34A804061 | 19C657A74 | 385734710 | 3FAC27628 | 0707BED4E | 32F20F45E |
| 125 | 34994C46C | 1C6B99499 | 1AF24D850 | 11AD795D3 | 19288BFE9 | 1360C1B96 | 3B5D8DBC0 | 2554E72D6 |
| 126 | 22D7095A4 | 34B70502A | 3F0CB27D2 | 04FC214E6 | 24C0B80C5 | 03D6F4DC8 | 1432A099E | 26300D70E |
| 127 | 21C33416F | 18B894695 | 3AC062614 | 3537CF601 | 00A20A8B8 | 1CD10BAF5 | 394DF1DC0 | 0925851ED |

As described above, the SA-preamble received from an Advanced Base Station (ABS) is used to obtain a cell identity. That is, an Advanced Mobile Station (AMS) detects a matched sequence by comparing auto-correlation or cross-correlation of the SA-preamble sequence received from the ABS with auto-correlation or cross-correlation of an SA-preamble sequence of Table 2 to Table 4. Nonetheless, since a sequence of an index X has a complex conjugate relationship with a sequence of a sequence index X+128, if it is determined whether the sequence of a sequence index 0 is matched with the received SA-preamble sequence using auto-correlation or cross-correlation, the sequence of a sequence index 128 can determine whether it is matched with the received SA-preamble sequence without the need to use auto-correlation or cross-correlation. In other words, a procedure for calculating auto-correlation or cross-correlation may be performed only with respect to SA-preamble sequences of half of SA-preamble sequences to detect a cell identity, without the need to calculate auto-correlation or cross-correlation for SA-preamble sequences corresponding to all cell identities. Consequently, the AMS acquires a segment identifier n and an SA-preamble sequence index q from the matched SA-preamble sequence and determines a cell identity according to Equation 3 and Equation 4.

Meanwhile, in order for the AMS to perform handover to a target ABS from a serving ABS, the AMS should be aware of whether the target ABS is accessible as a public ABS. Further, the AMS should be aware of whether the target ABS is a macro ABS, a macro hot-zone ABS, a relay ABS, or an Open Subscriber Group (OSG) femto ABS even when the target ABS is the public ABS and whether the target ABS is a Closed Subscriber Group (CSG)-closed ABS or a CSG-open ABS even when the target ABS is a private ABS.

Accordingly, all SA-preamble sequences of Table 2 to Table 4 need to be partitioned according to ABS type. The AMS recognizes the type of a target ABS and compares SA-preamble sequences of a specific partition with only the received SA-preamble sequence, thereby acquiring a cell identity.

More specifically, 256 SA-preamble sequences per segment, i.e. a total of 768 SA-preamble sequences (or cell identities) is partitioned according to ABS type. In this case, since the AMS is already aware of a type of an ABS which will be accessed thereby, the AMS detects a matched sequence by comparing a received SA-preamble sequence with SA-preamble sequences existing within the specific partition and determines a cell identity using the result of comparison.

Figure 8:
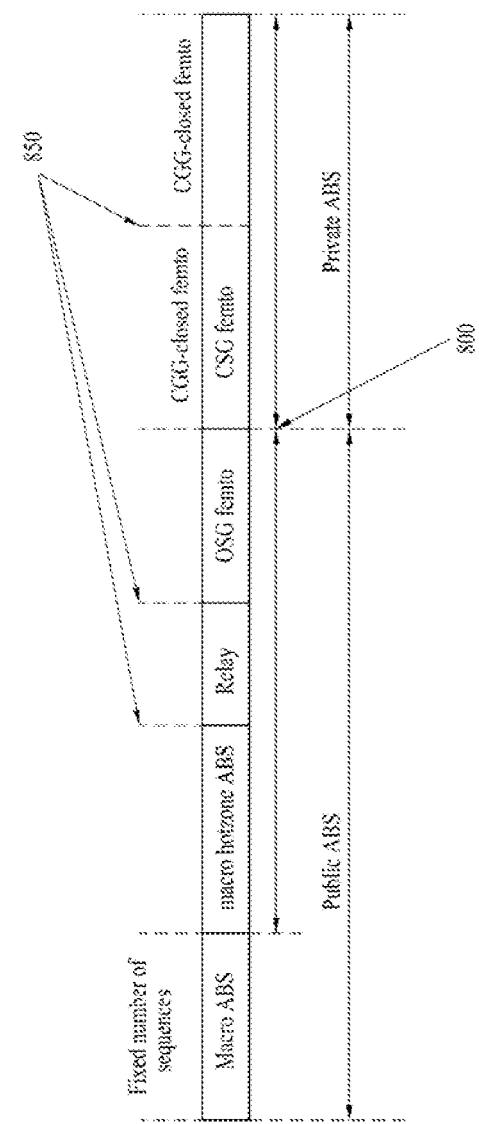
FIG. 8 is a diagram explaining an SA-preamble sequence partitioning scheme in an IEEE 802.16m system.

FIG. 8 is a diagram explaining an SA-preamble sequence partitioning scheme in an IEEE 802m system.

Referring to FIG. 8, the SA-preamble sequences shown in Table 2 to Table 4 or cell identities corresponding to the SA-preamble sequences are partitioned into a plurality of subsets which are not overlapped with one another and each subset is exclusively used for a specific ABS type. The partition of the SA-preamble sequences may flexibly vary according to a situation of a service provider and partition information needs to be transmitted to the AMS with minimum overhead.

In the first step, SA-preamble sequences are partitioned as indicated by reference numeral 800 into SA-preamble sequences (or cell identities) for a public ABS and SA-preamble sequences (or cell identities) for a private ABS, for example, a CSG femto ABS. According to partition of the first step, information about whether all AMSs are accessible to target ABSs can be provided.

In the second step, SA-preamble sequences for the public ABS are partitioned in more detail as indicated by reference numeral 850 according to the type of the public ABS, for example, a macro hot-zone ABS, a relay ABS, and an OSG femto ABS. Similarly, SA-preamble sequences for the private ABS are partitioned in more detail according to the type of the private ABS, for example, a CSG-closed ABS and a CSG-open ABS.

In this case, since a boundary between the public ABS and the private ABS, sequence indexes 0 to 257 of the macro ABS of the public ABS, and the last sequence index 767 are already known, a total of three pieces of boundary information including boundary information between the hot-zone ABS and the relay ABS, boundary information between the relay ABS and the OSG-femto ABS, and boundary information between the CSG-closed ABS and the CSG-open ABS are needed.

An example of partitioning cell identities or SA-preamble sequences based on the boundary information is shown in Table 5. In Table 5, n indicates a segment identity.

TABLE 5

| Value indicated in 4bit-SFH SP3 | IDCell partition for public ABS (Number of sequence per each segmentation) | IDCell partition for CSG-femto ABS (Number of sequence per each segmentation) |
|---|---|---|
| 0000 | 86 + 256*n~95 + 256*n (10) | 96 + 256*n~255 + 256*n (160) |
| 0001 | 86 + 256*n~105 + 256*n (20) | 106 + 256*n~255 + 256*n (150) |
| 0010 | 86 + 256*n~115 + 256*n (30) | 116 + 256*n~255 + 256*n (140) |
| 0011 | 86 + 256*n~125 + 256*n (40) | 126 + 256*n~255 + 256*n (130) |
| 0100 | 86 + 256*n~135 + 256*n (50) | 136 + 256*n~255 + 256*n (120) |
| 0101 | 86 + 256*n~145 + 256*n (60) | 146 + 256*n~255 + 256*n (110) |
| 0110 | 86 + 256*n~155 + 256*n (70) | 156 + 256*n~255 + 256*n (100) |
| 0111 | 86 + 256*n~165 + 256*n (80) | 166 + 256*n~255 + 256*n (90) |
| 1000 | 86 + 256*n~175 + 256*n (90) | 176 + 256*n~255 + 256*n (80) |
| 1001 | 86 + 256*n~185 + 256*n (100) | 186 + 256*n~255 + 256*n (70) |
| 1010 | 86 + 256*n~195 + 256*n (110) | 196 + 256*n~255 + 256*n (60) |
| 1011 | 86 + 256*n~205 + 256*n (120) | 206 + 256*n~255 + 256*n (50) |
| 1100 | 86 + 256*n~215 + 256*n (130) | 216 + 256*n~255 + 256*n (40) |
| 1101 | 86 + 256*n~225 + 256*n (140) | 226 + 256*n~255 + 256*n (30) |
| 1110 | 86 + 256*n~235 + 256*n (150) | 236 + 256*n~255 + 256*n (20) |
| 1111 | 86 + 256*n~245 + 256*n (160) | 246 + 256*n~255 + 256*n (10) |

First, when it is assumed that the number of SA-preamble sequences or cell identities for a macro ABS is fixed, the partition of the SA-preamble sequences is performed by the following two steps.

The following Table 6 shows an example of partially applying granularity of 20 sequences per segment in order to support the case in which all ABSs are public ABSs or the case in which all ABSs except for the micro cell are are private ABSs.

TABLE 6

| Value indicated in 4bit-SFH SP3 | IDCell partition for public ABS (Number of sequence per each segmentation) | IDCell partition for CSG-femto ABS (Number of sequence per each segmentation) |
|---|---|---|
| 0000 | 86 + 256*n~86 + 256*n (0) | 86 + 256*n~255 + 256*n (170) |
| 0001 | 86 + 256*n~105 + 256*n (20) | 106 + 256*n~255 + 256*n (150) |
| 0010 | 86 + 256*n~115 + 256*n (30) | 116 + 256*n~255 + 256*n (140) |
| 0011 | 86 + 256*n~125 + 256*n (40) | 126 + 256*n~255 + 256*n (130) |
| 0100 | 86 + 256*n~135 + 256*n (50) | 136 + 256*n~255 + 256*n (120) |
| 0101 | 86 + 256*n~145 + 256*n (60) | 146 + 256*n~255 + 256*n (110) |
| 0110 | 86 + 256*n~155 + 256*n (70) | 156 + 256*n~255 + 256*n (100) |
| 0111 | 86 + 256*n~165 + 256*n (80) | 166 + 256*n~255 + 256*n (90) |
| 1000 | 86 + 256*n~175 + 256*n (90) | 176 + 256*n~255 + 256*n (80) |
| 1001 | 86 + 256*n~185 + 256*n (100) | 186 + 256*n~255 + 256*n (70) |

TABLE 6-continued

| Value indicated in 4bit-SFH SP3 | IDCell partition for public ABS (Number of sequence per each segmentation) | IDCell partition for CSG-femto ABS (Number of sequence per each segmentation) |
|---|---|---|
| 1010 | 86 + 256*n~195 + 256*n (110) | 196 + 256*n~255 + 256*n (60) |
| 1011 | 86 + 256*n~205 + 256*n (120) | 206 + 256*n~255 + 256*n (50) |
| 1100 | 86 + 256*n~215 + 256*n (130) | 216 + 256*n~255 + 256*n (40) |
| 1101 | 86 + 256*n~225 + 256*n (140) | 226 + 256*n~255 + 256*n (30) |
| 1110 | 86 + 256*n~235 + 256*n (150) | 236 + 256*n~255 + 256*n (20) |
| 1111 | 86 + 256*n~255 + 256*n (170) | 255 + 256*n~255 + 256*n (0) |

Figure 9:
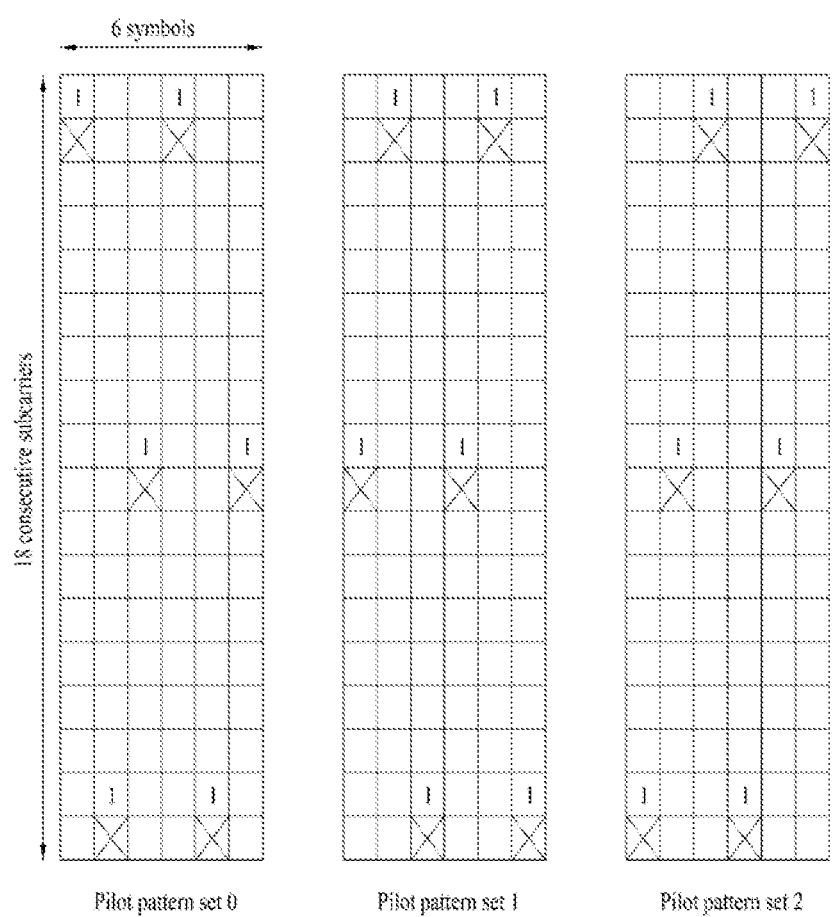
FIGS. 9 and 10 are diagrams explaining interlaced pilot patterns used in an IEEE 802.16m system.
Figure 10:
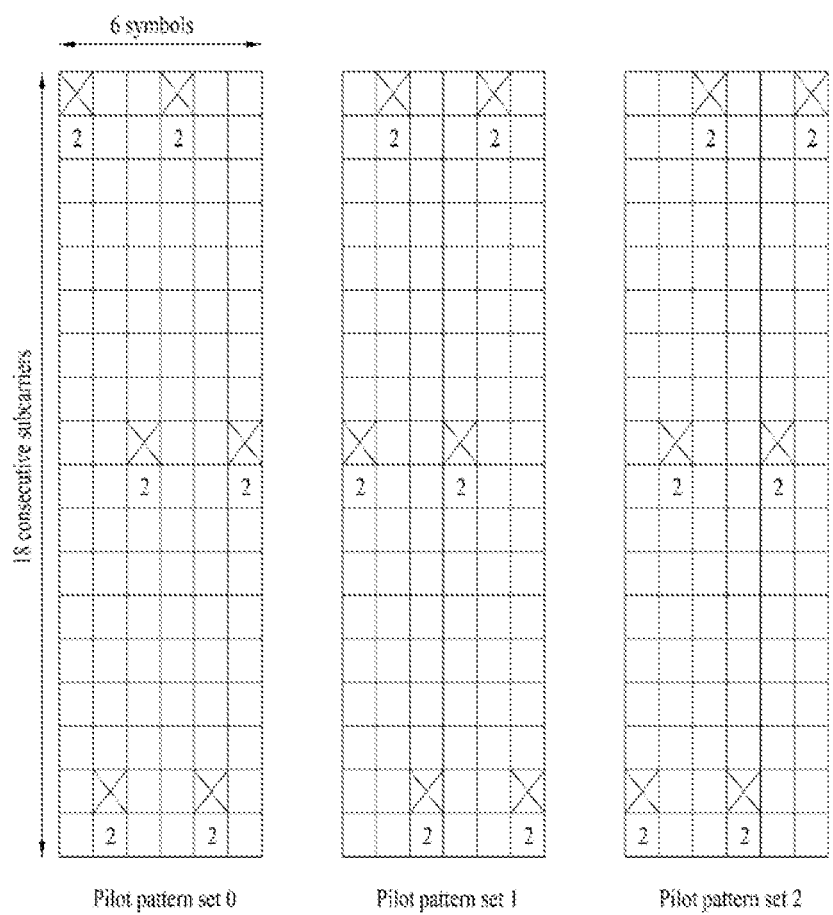

FIGS. 9 and 10 are diagrams explaining interlaced pilot patterns used in an IEEE 802.16m system. Especially, FIG. 9 shows an interlaced pilot pattern for a first stream and FIG. 10 shows an interlaced pilot pattern for a second stream, when two data streams are supported.

Referring to FIGS. 9 and 10, an interlaced pilot pattern is applied per segment under the assumption that a frequency reuse factor is 3. For example, if a cell identity when a segment identity is 0 is mapped to a corresponding AMS, a pilot pattern set 0 in FIGS. 9 and 10 may be used. If a cell identity when a segment identity is 1 is mapped to a corresponding AMS, a pilot pattern set 1 in FIGS. 9 and 10 may be used.

As mentioned in the foregoing description, in a current IEEE 802.16m system, SA-preamble sequences are partitioned into three segments under the assumption that the frequency reuse factor is 3. A total of 768 cell identities is divided into 256 cell identities per segment. Accordingly, since SA-preamble sequences are present per segment, the AMS is able to recognize to which segment a cell identity thereof belongs and recognize a cell type.

If a system supports both a frequency reuse factor 3 and a frequency reuse factor 2, a method is needed through which the AMS detects a cell identity to which it belongs and determines a cell type even in a situation in which the AMS does not know the frequency reuse factor.

The present invention proposes a method capable of supporting the case in which a frequency reuse factor is 2 without affecting a legacy system in a situation in which an SA-preamble sequence structure of a frequency reuse factor 3 as in the legacy system is defined. In addition, the present invention proposes a method for partitioning SA-preamble sequences (or cell identities) when a frequency reuse factor is 2 without affecting a legacy system.

To minimizing an influence of a legacy system, an ABS of the present invention transmits sequences divided by three segment identities during transmission of SA-preamble sequences even when the ABS manages cells having a frequency reuse factor 2. Moreover, the ABS transmits interlaced pilot patterns applied for SFH transmission to specific pattern indexes divided by three segment identities. Namely, there is no change in the part of the ABS.

Next, upon detecting SA-preamble sequences, since the AMS does not know whether a frequency reuse factor of cells managed by the ABS is 2 or 3, the AMS attempts to measure all SA-preamble sequences corresponding to segment identities 0 to 2. If the SA-preamble sequences are measured, the AMS calculates a mapped cell identity using Equation 4 and uses the calculated cell identity as a DLPermbase value for subcarrier permutation.

Even during application of interlaced pilot patterns, the AMS applies pilot patterns corresponding to segment identities of the measured SA-preamble sequences irrespective of whether cells managed by the ABS have a frequency reuse factor 2 or 3. In other words, it is possible to use interlaced pilot patterns when the frequency reuse factor is 3 even in a situation in which the frequency reuse factor is 2.

Next, a method for applying SA-preamble sequences (or cell identities) designed under the assumption that a frequency reuse factor is 3 to a situation in which the frequency reuse factor is 2 will be described.

If the AMS measures SA-preamble sequences to recognize segment identities and cell identities of the ABS and decodes an SFH, the AMS is able to discern information about whether the frequency reuse factor of the corresponding ABS is 2 or 3. Accordingly, the AMS may map cell identities (when the frequency reuse factor is 3) to segment identities when the frequency reuse factor is 2 according to the frequency reuse factor.

Namely, cell identities corresponding to the case in which a segment identity is 0 (e.g. cell identities 0 to 255) and cell identities corresponding to the case in which a segment identity is 1 (e.g. cell identities 256 to 511) are used without change. However, cell identities 512 to 639 among cell identities corresponding to the case where a segment identity is 2 (e.g. cell identities 512 to 767) may be mapped to the segment identity 0 and cell identities 640 to 767 may be mapped to the segment identity 1.

Alternatively, cell identities corresponding to even numbers (or odd numbers) among cell identities 512 to 639 of cell identities when the segment identity is 2 are mapped to segment identity 0 and cell identities corresponding to odd numbers (or even numbers) are mapped to segment identity 1. However, this embodiment cannot support the complex conjugate operation of Equation 6.

Accordingly, in order to support the complex conjugate operation of Equation 6, two paired cell identities when the segment identity is 2 may be alternately mapped to the segment identity 0 and the segment identity 1. That is, cell identities (512, 640), (513, 641), (516, 644), (517, 645), ..., (637, 765) among cell identities when the segment identity is 2 are mapped to the segment identity 0 and cell identities (514, 642), (515, 643), (518, 646), (519, 647), ..., (638, 766), (639, 767) are mapped to the segment identity 1. Each of the two paired cell identities can support a complex conjugate operation. It is obvious that order of the mapped segment identities 0 and 1 is interchangeable. This can be expressed by, for example, Equation 7.

$$\begin{aligned}&\text{If Reuse} = \\ &\quad 2(\text{e.g. } FPCT = 2 \text{ or } FPCT = 3 \text{ with } FP_0, FP_1, FP_2) \\ &\quad \& \text{ Segment} ID = 2(\text{or floor } (IDCell, 256) = 2), \\ &\text{If } \mathrm{mod}((\mathrm{mod}(IDCell, 256), 4) = 0 \text{ or } 1, \\ &\text{then, segment } ID = 0 \\ &\text{If } \mathrm{mod}((\mathrm{mod}(IDCell, 256), 4) = 2 \text{ or } 3, \\ &\text{then, segment } ID = 1\end{aligned} \quad \text{[Equation 7]}$$

Equation 7 indicates that cell identities corresponding to the segment identity 2 when the frequency reuse factor is 2 are mapped to the segment identity 0 and segment identity 1 and can support the complex conjugate operation of Equation 6.

As another embodiment, all cell identities corresponding to the segment identities 0 to 2 may be mapped to segment identities 0 and 1 as indicated by Equation 8.

If Reuse = [Equation 8]

2(e.g. $FPCT = 2$ or $FPCT = 3$ with $FP_0$, $FP_1$, $FP_2$),

If $\mod((\mod(IDCell, 256), 4) = 0$ or 1, then, segment $ID = 0$

If $\mod((\mod(IDCell, 256), 4) = 2$ or 3, then, segment $ID = 1$

However, Equation 8 cannot support the complex conjugate operation of Equation 6.

In the above embodiments, although it is assumed that a segment identity corresponding to cell identities mapped to other segments is 2, it is obvious that cell identities corresponding to a segment identity 1 or 2 may be mapped to other segments.

Meanwhile, a modified segment identity calculated through Equation 7 and Equation 8 may be applied to determination of an interlaced pilot pattern, a downlink pilot power boosting level, or an uplink FFR pattern.

For example, when interlaced pilot patterns are defined only when the frequency reuse factor is 3 as in a legacy system, i.e. if three pilot patterns are present, only two of the three pilot patterns can be used when the frequency reuse factor is 2 (i.e. pilot patterns corresponding to the segment identifiers 0 and 1 are used).

A method for applying an SA-preamble sequence partitioning scheme for distinguishing between a macro ABS and a non-macro ABS (i.e. between a public ABS and a private ABS) shown in FIG. 8 will now be described. As described in the above method, a total of 768 cell identifiers, 384 cell identifiers per segment, is mapped to segment identities when the frequency reuse factor is 2. 129 (=86*3)/2) cell identifies of a macro ABS may be mapped to each segment identifier when the frequency reuse factor is 2. 510 (768-258) cell identities of a non-macro ABS may be present and 255 cell identifiers may be mapped to each of two segments.

Figure 11:
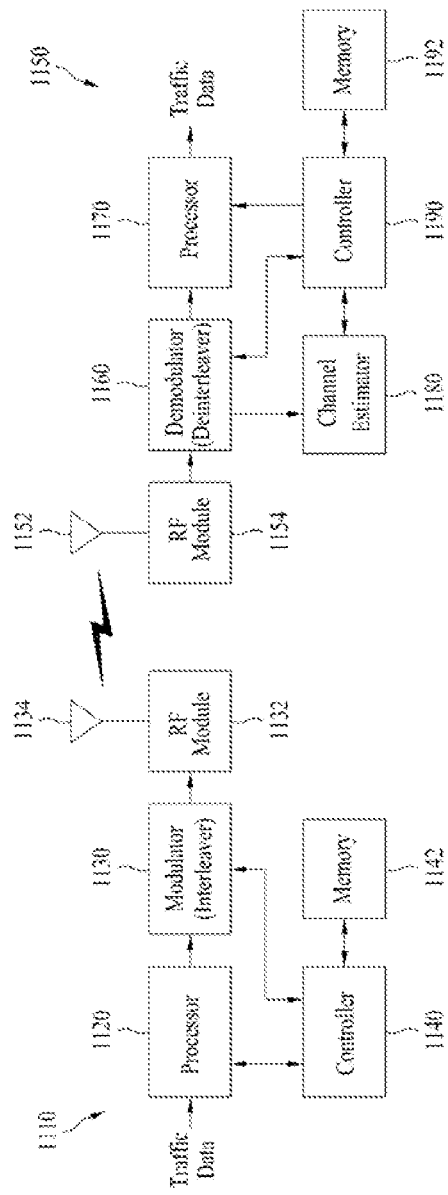
FIG. 11 is a block diagram showing a transmitter and a receiver according to an exemplary embodiment of the present invention.

FIG. 11 is a block diagram showing a transmitter and a receiver according to an exemplary embodiment of the present invention. In downlink, a transmitter 1110 is a part of a BS and a receiver 1150 is a part of an MS. In uplink, the transmitter 1110 is a part of the MS and the receiver 1150 is a part of the BS.

In the transmitter 1110, a processor 1120 encodes, interleaves and symbol-maps data (e.g., traffic data and signaling) to generate data symbols. The processor 1120 generates pilot symbols and multiplexes the data symbols and pilot symbols.

A modulator 1130 generates transmission symbols according to a radio access scheme. The radio access scheme includes FDMA, TDMA, CDMA, SC-FDMA, MC-FDMA, OFDMA, and combinations thereof. The modulator 1130 causes data to be dispersed in a frequency domain and to be transmitted using various permutation methods exemplified in the embodiments of the present invention. A Radio Frequency (RF) module 1132 performing processing (e.g. analog conversion, amplification, filtering, and frequency up-conversion) of the transmission symbols and generates an RF signal transmitted via an antenna 1134.

In the receiver 1150, an antenna 1152 receives a signal transmitted from the transmitter 1110 and provides the received signal to an RF module 1154. The RF module 1154 performs processing (e.g. filtering, amplification, frequency down-conversion, and digitalization) of the received signal and provides input samples.

A demodulator 1160 demodulates the input samples and provides data values and pilot values. A channel estimator 1180 derives channel estimation values based on the received pilot values. The demodulator 1160 detects (or equalizes) data with respect to the received data values by using the channel estimation values and provides data symbol estimation values for the transmitter 1110. The demodulator 1160 performs a reverse operation of various permutation methods exemplified in the embodiments of the present invention to re-arrange data dispersed in a frequency domain and a time domain to an original order. A processor 1170 symbol-demaps, deinterleaves, and decodes the data symbol estimation values and provides the decoded data.

Generally, processing at the demodulator 1160 and the processor 1170 in the receiver 1150 is complementary to processing at the modulator 1130 and the processor 1120 in the transmitter 1110, respectively.

Controllers 1140 and 1190 manage and control operation of various processing modules in the transmitter 1110 and the receiver 1150, respectively. Memories 1142 and 1192 store program code and data for the transmitter 1110 and the receiver 1150, respectively.

The modules shown in FIG. 11 are for description only and the transmitter and/or receiver may further include necessary modules. Some modules/functions may be omitted or separated into different modules, and two or more modules may be integrated into one module.

The exemplary embodiments described hereinabove are combinations of elements and features of the present invention. The elements or features should be considered selective unless explicitly mentioned otherwise. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment. It will be obvious that claims that are not explicitly cited in the appended claims may be presented in combination as an exemplary embodiment of the present invention or included as a new claim by subsequent amendment after the application is filed.

In this document, the exemplary embodiments of the present invention have been described centering on a data transmission/reception relationship between a BS and an MS. A specific operation described as performed by the BS may be performed by an upper node of the BS in some cases. Namely, it is apparent that, in a network comprised of a plurality of network nodes including the BS, various operations performed for communication with the MS may be performed by the BS, or network nodes other than the BS. The term 'BS' may be replaced with the terms fixed station, Node B, eNode B (eNB), access point, etc. The term 'MS' may be replaced with the terms User Equipment (UE), Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

It is apparent to those skilled in the art that the present invention may be carried out in other specific ways than those set forth herein without departing from the spirit and essential characteristics of the present invention. The above detailed description is therefore to be construed in all aspects as illustrative and not restrictive. The scope of the invention should be determined by reasonable interpretation of the appended, and all changes coming within the meaning and equivalency range of the appended claims are intended to be embraced therein.

Industrial Applicability

The present invention may be applied to a wireless communication system. Specifically, the present invention may be applied to a wireless mobile communication device used for a cellular system.

The invention claimed is:

1. A method for detecting a segment identity by a mobile station in a wireless communication system, comprising:
acquiring a cell identity and the segment identity corresponding to the cell identity from a Secondary Advanced (SA)-preamble sequence received from a base station, wherein the segment identity is one of first, second or third identities;
determining a frequency reuse factor of the base station as being 2 or 3; and
if the frequency reuse factor is 2 and the acquired segment identity is the third segment identity, converting the segment identity corresponding to the cell identity into the first segment identity or the second segment identity,
wherein, if the frequency reuse factor of the base station is 3, an SA-preamble sequence of a cell identity x included in one segment identity has a complex conjugate relationship with an SA-preamble sequence of a cell identity x+128 included in the one segment identity, and the one segment identity includes 256 cell identities, and
wherein the converting the segment identity is performed according to the following Equation:
Equation if mod((mod(IDCell, 256), 4)=0 or 1, then, segment ID=0 if mod (mod(IDCell,256), 4)=2 or 3, then, segment ID=1 where values of the first, second, and third segment identities are 0, 1, and 2, respectively, IDCell indicates the cell identity, and the segment ID indicates a converted segment identity.

2. The method of claim 1, wherein the first to third segment identities identify three segments managed by the base station, and the first and second segment identities identify two segments managed by the base station.

3. The method of claim 1, wherein, if the frequency reuse factor of the base station is 2, each of the first and second segment identities includes 384 cell identities and the 384 cell identities are partitioned into 129 cell identities for a macro base station and 255 cell identities or a non-macro base station.

4. A mobile station comprising:
a reception module for receiving a Secondary Advanced (SA)-preamble sequence received from a base station; and
a processor for acquiring a cell identity and a segment identity corresponding to the cell identity from the SA-preamble sequence wherein the segment identity is one of first, second or third identities, determining a frequency reuse factor of the base station as being 2 or 3, and if the frequency reuse factor is 2 and the acquired segment identity is the third segment identity, converting the segment identity corresponding to the cell identity into the first segment identity or the second segment identity
wherein, if the frequency reuse factor of the base station is 3, an SA-preamble sequence of a cell identity x included in one segment identity has a complex conjugate relationship with an SA-preamble sequence of a cell identity x+128 included in the one segment identity, and the one segment identity includes 256 cell identities, and wherein the converting the segment identity is performed according to the following Equation:
Equation if mod ((mod(IDCell, 256), 4)=0 or 1, then, segment ID=0 if mod (mod(IDCell,256), 4)=2 or 3, then, segment ID=1 where values of the first, second, and third segment identities are 0, 1, and 2, respectively, IDCell indicates the cell identity, and segment ID indicates a converted segment identity.

5. The mobile station of claim 4, wherein the first to third segment identities identify three segments managed by the base station, and the first and second segment identities identify two segments managed by the base station.

6. The mobile station of claim 4, wherein, if the frequency reuse factor of the base station is 2, each of the first and second segment identities includes 384 cell identities and the 384 cell identities are partitioned into 129 cell identities for a macro base station and 255 cell identities for a non-macro base station.

* * * * *